US011941883B2

(12) United States Patent
Tang et al.

(10) Patent No.: US 11,941,883 B2
(45) Date of Patent: Mar. 26, 2024

(54) VIDEO CLASSIFICATION METHOD, MODEL TRAINING METHOD, DEVICE, AND STORAGE MEDIUM

(71) Applicant: Tencent Technology (Shenzhen) Company Limited, Shenzhen (CN)

(72) Inventors: Yongyi Tang, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 493 days.

(21) Appl. No.: 17/230,778

(22) Filed: Apr. 14, 2021

(65) Prior Publication Data

US 2021/0232825 A1    Jul. 29, 2021

Related U.S. Application Data

(63) Continuation of application No. PCT/CN2020/077809, filed on Mar. 4, 2020.

(30) Foreign Application Priority Data

Mar. 6, 2019    (CN) .......................... 201910168236.9

(51) Int. Cl.
*G06V 20/40*    (2022.01)
*G06N 20/00*    (2019.01)
(Continued)

(52) U.S. Cl.
CPC ............. *G06V 20/41* (2022.01); *G06N 20/00* (2019.01); *G06V 10/56* (2022.01); *G06V 10/62* (2022.01); *G06V 10/751* (2022.01); *G06V 10/82* (2022.01)

(58) Field of Classification Search
CPC ........ G06V 20/41; G06V 10/56; G06V 10/62; G06V 10/751; G06V 10/82; G06N 20/00;
(Continued)

(56) References Cited

U.S. PATENT DOCUMENTS 7,984,010 B2 *   7/2011   Campbell .............. G06N 20/00
                                                    704/275
9,977,968 B2     5/2018   Bernal et al.
(Continued)

FOREIGN PATENT DOCUMENTS

CN    105426883 A    3/2016
CN    108875456 A    11/2018
(Continued)

OTHER PUBLICATIONS

Extended European Search Report, EP20767282.5, dated Apr. 11, 2022, 11 pgs.
(Continued)

*Primary Examiner* — Wesley J Tucker
(74) *Attorney, Agent, or Firm* — Morgan, Lewis & Bockius LLP

(57) ABSTRACT

This application discloses a video classification method performed by a computer device. The method includes: obtaining an image frame sequence corresponding to a to-be-classified video file; obtaining an appearance information feature sequence corresponding to the image frame sequence by using an image classification network model, the appearance information feature sequence including T appearance information features; obtaining a motion information feature sequence corresponding to the appearance information feature sequence by using a motion prediction network model, the motion information feature sequence including T motion information features, and the motion prediction network model being configured to predict the
(Continued)

motion information features corresponding to the appearance information features; and determining a video classification result of the to-be-classified video file according to the appearance information feature sequence and the motion information feature sequence. This application further provides a model training method, thereby saving computing time and resources while improving data processing efficiency.

17 Claims, 8 Drawing Sheets

(51) Int. Cl.
   *G06V 10/56*   (2022.01)
   *G06V 10/62*   (2022.01)
   *G06V 10/75*   (2022.01)
   *G06V 10/82*   (2022.01)

(58) Field of Classification Search
   CPC ........ G06N 3/044; G06N 3/045; G06N 3/048; G06N 3/08
   See application file for complete search history.

(56) References Cited

U.S. PATENT DOCUMENTS

| | | | |
|---|---|---|---|
| 11,250,324 B2* | 2/2022 | Samples | G06N 3/08 |
| 2017/0255831 A1 | 9/2017 | Bernal et al. | |
| 2019/0065910 A1* | 2/2019 | Wang | G06T 11/60 |
| 2020/0218901 A1* | 7/2020 | Elder | G06V 20/46 |
| 2021/0192756 A1* | 6/2021 | Huang | G06N 3/045 |
| 2021/0304421 A1* | 9/2021 | Othman | G06Q 30/0631 |
| 2023/0177324 A1* | 6/2023 | Park | G06F 18/00 706/25 |
| 2023/0316749 A1* | 10/2023 | Sanchez Lozano | G06V 40/20 382/159 |

FOREIGN PATENT DOCUMENTS

| | | |
|---|---|---|
| CN | 108960031 A | 12/2018 |
| CN | 109919087 A | 6/2019 |

OTHER PUBLICATIONS

Mingze Xu et al., "Fully-Coupled Two-Stream Spatiotemporal Networks for Extremely Low Resolution Action Recognition", arxiv.org, Cornell University, Ithaca, NY, Jan. 11, 2018, XP080852350, 9 pgs.
Rui Zhao et al., "Two-Stream RNN/CNN for Action Recognition in 3D Videos", arxiv.org, Cornell University, Ithaca, NY, Mar. 22, 2017, XP080752755, 8 pgs.
Dengdi Sun et al., "Spatial-Temporal Attention for Action Recognition", Sep. 19, 2018, Advances in Biometrics: International Conference, ICB 2007, Seoul, Korea, Aug. 27-29, 2007; Proceedings, Springer, Berlin, pp. 854-864, XP047486454.
Zhang Liang et al., "Learning Spatiotemporal Features Using 3DCNN and Convolutional LSTM for Gesture Recognition", 2017 IEEE International Conference on Computer Vision Workshops, Oct. 22, 2017, pp. 3120-3128, XP033303796.
Tencent Technology, IPRP, PCT/CN2020/077809, Aug. 25, 2021, 6 pgs.
Tencent Technology, ISR, PCT/CN2020/077809, Jun. 11, 2020, 2 pgs.
Tencent Technology, Written Opinion, PCT/CN2020/077809, dated Jun. 11, 2020, 5 pgs.
Tendent Technology, European Office Action, EP Patent Application No. 20767282.5, dated Nov. 28, 2023, 5 pgs.

* cited by examiner

VIDEO CLASSIFICATION METHOD, MODEL TRAINING METHOD, DEVICE, AND STORAGE MEDIUM

CROSS-REFERENCE TO RELATED APPLICATIONS

This application is a continuation application of PCT Patent Application No. PCT/CN2020/077809, entitled "VIDEO CLASSIFICATION METHOD, MODEL TRAINING METHOD AND APPARATUS", filed on Mar. 4, 2020, which claims priority to Chinese Patent Application No. 201910168236.9, entitled "VIDEO CLASSIFICATION METHOD, MODEL TRAINING METHOD AND APPARATUS", filed on Mar. 6, 2019, all of which are incorporated herein by reference in their entirety.

FIELD OF THE TECHNOLOGY

This application relates to the field of artificial intelligence, and in particular, to a video classification method, a model training method, a device, and a storage medium.

BACKGROUND OF THE DISCLOSURE

Video classification is to give a video clip, and classify contents contained in the video clip. Video classes generally include action (for example, making a cake), scenario (for example, a beach), object (for example, a table), and the like. Video action classification is most popular. After all, an action contains dynamic elements, which cannot be described by a static image. Therefore, it is common to classify videos based on motions features.

Currently, a commonly used video classification technology is mainly: first classifying appearance information features extracted from red green blue (RGB) images of a video, and then further using motion information features extracted from optical flow images to improve video classification performance. During extraction of the motion information features, an optical flow image needs to be calculated according to two or more consecutive frames of RGB images of the video, and then the motion information features of the video are obtained by using a convolutional neural network or through another method.

However, in an existing solution, an optical flow image needs to be calculated according to at least two frames of RGB images, and for videos, assuming that calculation is performed with resolution of 24 frames per second, a short video generally contains contents with a time length longer than 15 seconds, and a long video usually lasts up to tens of minutes. Therefore, a large amount of time and space is required for calculating optical flow images, to obtain optical flow image representations of a video, causing relatively low data processing efficiency and a relatively large quantity of occupied computing resources and storage resources.

SUMMARY

Embodiments of this application provide a video classification method, a model training method, a device, and a storage medium, which can implement automatic classification of a video, without a need to calculate optical flow images according to appearance information features of the video to calculate motion information features by using the optical flow images. Instead, the motion information features corresponding to the appearance information features can be directly obtained by using a motion prediction network model, so as to save computing time and resources, thereby improving data processing efficiency.

In view of this, a first aspect of this application provides a video classification method, applicable to a computer device, the method including:

obtaining an image frame sequence corresponding to a to-be-classified video file, the image frame sequence including T image frames, T being an integer greater than 1;

obtaining an appearance information feature sequence corresponding to the image frame sequence, the appearance information feature sequence including T appearance information features, each appearance information feature having a correspondence with one of the T image frames;

obtaining a motion information feature sequence corresponding to the appearance information feature sequence, the motion information feature sequence including T motion information features, each motion information feature having a correspondence with one of the T appearance information feature; and determining a video classification result of the to-be-classified video file according to the appearance information feature sequence and the motion information feature sequence.

A second aspect of this application provides a model training method, including:

obtaining an optical flow image sequence corresponding to a to-be-trained video file, the optical flow image sequence including a plurality of optical flow images;

obtaining a to-be-trained appearance information feature sequence corresponding to the to-be-trained video file, the to-be-trained appearance information feature sequence including a plurality of to-be-trained appearance information features;

obtaining an actual motion information feature sequence according to the optical flow image sequence corresponding to the to-be-trained video file, the actual motion information feature sequence including T actual motion information features, T being an integer greater than 1;

obtaining a predicted motion information feature sequence corresponding to the to-be-trained appearance information feature sequence by using a to-be-trained motion prediction network model, the predicted motion information feature sequence including T predicted motion information features;

determining a model parameter according to the actual motion information feature sequence and the predicted motion information feature sequence; and training the to-be-trained motion prediction network model by using the model parameter, to obtain a motion prediction network model.

A third aspect of this application provides a video classification apparatus, including:

an obtaining module, configured to obtain an image frame sequence corresponding to a to-be-classified video file, the image frame sequence including T image frames, T being an integer greater than 1;

the obtaining module being further configured to obtain an appearance information feature sequence corresponding to the image frame sequence, the appearance information feature sequence including T appearance information features, each appearance information feature having a correspondence with one of the T image frames;

the obtaining module being further configured to obtain a motion information feature sequence corresponding to the appearance information feature sequence, the motion information feature sequence including T motion information features, each motion information feature having a correspondence with one of the T appearance information feature, and a motion prediction network model being configured to predict the motion information features corresponding to the appearance information features; and a determining module, configured to determine a video classification result of the to-be-classified video file according to the appearance information feature sequence and the motion information feature sequence obtained by the obtaining module.

In a first implementation of the third aspect of the embodiments of this application, the obtaining module is specifically configured to:

obtain the appearance information feature sequence corresponding to the image frame sequence by using an image classification network model; and obtain the motion information feature sequence corresponding to the appearance information feature sequence by using a motion prediction network model, the motion prediction network model being configured to predict the motion information features corresponding to the appearance information features.

In a first implementation of the third aspect of the embodiments of this application, the obtaining module is specifically configured to:

obtain the to-be-classified video file; and decode the to-be-classified video file, to obtain the image frame sequence, a sampling frequency for each image frame being the same.

In a second implementation of the third aspect of the embodiments of this application, the obtaining module is specifically configured to:

obtain an appearance information feature corresponding to a $t^{th}$ image frame by using the image classification network model, t being an integer greater than or equal to 1 and less than or equal to T; and generate the appearance information feature sequence according to the T appearance information features when an appearance information feature corresponding to each of the T image frames has been obtained.

In a third implementation of the third aspect of the embodiments of this application, the obtaining module is specifically configured to:

obtain a $t^{th}$ appearance information feature corresponding to an $i^{th}$ step, i being an integer greater than or equal to 1, and t being an integer greater than or equal to 1 and less than or equal to T;

obtain a $(t+1)^{th}$ motion information feature and a $(t-1)^{th}$ motion information feature corresponding to an $(i-1)^{th}$ step;

determine a $t^{th}$ motion information feature corresponding to the $i^{th}$ step according to the $t^{th}$ appearance information feature, the $(t+1)^{th}$ motion information feature, and the $(t-1)^{th}$ motion information feature by using the motion prediction network model; and generate the motion information feature sequence according to the T motion information features when a motion information feature corresponding to each of the T appearance information features has been obtained.

In a fourth implementation of the third aspect of the embodiments of this application, the obtaining module is specifically configured to:

calculate a $(t+1)^{th}$ update gate vector and a $(t-1)^{th}$ update gate vector corresponding to the $i^{th}$ step according to the $t^{th}$ appearance information feature, the $(t+1)^{th}$ motion information feature, and the $(t-1)^{th}$ motion information feature by using an update gate of the motion prediction network model;

calculate a $(t+1)^{th}$ output gate vector and a $(t-1)^{th}$ output gate vector corresponding to the $i^{th}$ step according to the $t^{th}$ appearance information feature, the $(t+1)^{th}$ motion information feature, and the $(t-1)^{th}$ motion information feature by using an output gate of the motion prediction network model;

calculate a $t^{th}$ hidden state feature vector corresponding to the $i^{th}$ step according to the $t^{th}$ appearance information feature, the $(t+1)^{th}$ motion information feature, the $(t-1)^{th}$ motion information feature, the $(t+1)^{th}$ update gate vector, and the $(t-1)^{th}$ update gate vector by using a hidden state of the motion prediction network model; and calculate the $t^{th}$ motion information feature corresponding to the $i^{th}$ step according to the $t^{th}$ hidden state feature vector and the $(t+1)^{th}$ output gate vector and the $(t-1)^{th}$ output gate vector corresponding to the $i^{th}$ step by using a final output layer of the motion prediction network model.

In a fifth implementation of the third aspect of the embodiments of this application, the obtaining module is specifically configured to:

calculate the $(t+1)^{th}$ update gate vector and the $(t-1)^{th}$ update gate vector in the following manner:

$$r_{t-1} = \sigma(W_r x_t + U_{r,t-1} s_{t-1}^{i-1});$$

$$r_{t+1} = \sigma(W_r x_t + U_{r,t+1} s_{t+1}^{i-1}),$$

where $r_{t-1}$ represents the $(t-1)^{th}$ update gate vector corresponding to the $i^{th}$ step, t represents a $t^{th}$ time point, $r_{t+1}$ represents the $(t+1)^{th}$ update gate vector corresponding to the $i^{th}$ step, $\sigma()$ represents a rectified linear unit, $W_r$ represents a first parameter matrix, $U_{r,t-1}$ represents a second parameter matrix corresponding to the $(t-1)^{th}$ update gate vector, $U_{r,t+1}$ represents a third parameter matrix corresponding to the $(t+1)^{th}$ update gate vector, $x_t$ represents the $t^{th}$ appearance information feature, $s_{t-1}^{i-1}$ represents the $(t-1)^{th}$ motion information feature corresponding to the $(i-1)^{th}$ step, and $s_{t+1}^{i-1}$ represents the $(t+1)^{th}$ motion information feature corresponding to the $(i-1)^{th}$ step;

calculate the $(t+1)^{th}$ output gate vector and the $(t-1)^{th}$ output gate vector in the following manner:

$$[z_{t+1}, z, z_{t-1}] = \text{soft max}([\tilde{z}_{t+1}, 1, \tilde{z}_{t-1}]),$$

$$\tilde{z}_{t-1} = \sigma(W_z x_t + U_{z,t-1} s_{t-1}^{i-1}),$$

$$\tilde{z}_{t+1} = \sigma(W_z x_t + U_{z,t+1} s_{t+1}^{i-1}),$$

where $Z_{t+1}$ represents the $(t+1)^{th}$ output gate vector corresponding to the $i^{th}$ step, $z_{t-1}$ represents the $(t-1)^{th}$ output gate vector corresponding to the $i^{th}$ step, z represents a preset output gate vector, $\tilde{z}_{t-1}$ represents a $(t-1)^{th}$ to-be-processed output gate vector corresponding to the $i^{th}$ step, $\tilde{z}_{t+1}$ represents a $(t+1)^{th}$ to-be-processed output gate vector corresponding to the $i^{th}$ step, soft max( ) represents a normalization function, $W_z$ represents a fourth parameter matrix, $U_{z,t-1}$ represents a fifth parameter matrix corresponding to the $(t-1)^{th}$ output gate vector, and $U_{z,t+1}$ represents a sixth parameter matrix corresponding to the $(t+1)^{th}$ output gate vector;

calculate the $t^{th}$ hidden state feature vector in the following manner:

$$h_t = \phi(W_h x_t + U_h[s_{t+1}^{i+1} \circ r_{t+1}, s_{t-1}^{i-1} \circ r_{t-1}]^T);$$

where $h_t$ represents the $t^{th}$ hidden state feature vector corresponding to the $i^{th}$ step, $\phi( )$ represents a sigmoid function, $W_h$ represents a seventh parameter matrix, $U_h$ represents an eighth parameter matrix, $[\ ]^T$ represents a matrix transpose, and $\circ$ represents dot multiplication; and calculate the $t^{th}$ motion information feature in the following manner:

$$s_t^i = z \circ h_t + z_{t-1} \circ s_{t+1}^{i-1} + z_{t+1} \circ s_{t+1}^{i+1};$$

where $s_t^i$ represents the $t^{th}$ motion information feature corresponding to the $i^{th}$ step.

In a sixth implementation of the third aspect of the embodiments of this application, the determining module is specifically configured to:
obtain a video class vector corresponding to the appearance information feature sequence and the motion information feature sequence, the video class vector including C video class elements, C being an integer greater than 1;
determine at least one target video class element from the video class vector; and
generate the video classification result of the to-be-classified video file according to the at least one target video class element.

A fourth aspect of this application provides a model training apparatus, including:
an obtaining module, configured to obtain an optical flow image sequence corresponding to a to-be-trained video file, the optical flow image sequence including a plurality of optical flow images;
the obtaining module being further configured to obtain a to-be-trained appearance information feature sequence corresponding to the to-be-trained video file, the to-be-trained appearance information feature sequence including a plurality of to-be-trained appearance information features;
the obtaining module being further configured to obtain an actual motion information feature sequence according to the optical flow image sequence corresponding to the to-be-trained video file, the actual motion information feature sequence including T actual motion information features, T being an integer greater than 1;
the obtaining module being further configured to obtain a predicted motion information feature sequence corresponding to the to-be-trained appearance information feature sequence by using a to-be-trained motion prediction network model, the predicted motion information feature sequence including T predicted motion information features;
a determining module, configured to determine a model parameter according to the actual motion information feature sequence obtained by the obtaining module and the predicted motion information feature sequence obtained by the obtaining module; and
a training module, configured to train the to-be-trained motion prediction network model by using the model parameter determined by the determining module, to obtain a motion prediction network model.

In a first implementation of the fourth aspect of embodiments of this application, the determining module is specifically configured to:

perform calculation according to the actual motion information feature sequence and the predicted motion information feature sequence by using a loss function, to obtain a target loss result; and
determine the model parameter according to the target loss result.

In a second implementation of the fourth aspect of the embodiments of this application, the determining module is specifically configured to calculate the target loss result in the following manner:

$$L_{MSE} = \frac{1}{T} \sum_t^T \|\tilde{S}^t - S^t\|_2^2;$$

where $L_{MSE}$ represents the target loss result, T represents a quantity of actual motion information features in the actual motion information feature sequence, $\tilde{S}^t$ represents a $t^{th}$ actual motion information feature in the actual motion information feature sequence, and $S^t$ represents a $t^{th}$ predicted motion information feature in the predicted motion information feature sequence, t being an integer greater than or equal to 1 and less than or equal to T.

A fifth aspect of this application provides a computer device, including: a memory, a transceiver, a processor, and a bus system,
the memory being configured to store a program;
the processor being configured to execute the program in the memory to perform the following operations:
obtaining an image frame sequence corresponding to a to-be-classified video file, the image frame sequence including T image frames, T being an integer greater than 1;
obtaining an appearance information feature sequence corresponding to the image frame sequence, the appearance information feature sequence including T appearance information features, each appearance information feature having a correspondence with one of the T image frames;
obtaining a motion information feature sequence corresponding to the appearance information feature sequence, the motion information feature sequence including T motion information features, each motion information feature having a correspondence with one of the T appearance information feature; and
determining a video classification result of the to-be-classified video file according to the appearance information feature sequence and the motion information feature sequence; and
the bus system being configured to connect the memory and the processor, to enable the memory and the processor to perform communication.

A sixth aspect of this application provides a server, including a memory, a transceiver, a processor, and a bus system,
the memory being configured to store a program;
the processor being configured to execute the program in the memory to perform the following operations:
obtaining an optical flow image sequence corresponding to a to-be-trained video file, the optical flow image sequence including a plurality of optical flow images;
obtaining a to-be-trained appearance information feature sequence corresponding to the to-be-trained video file, the to-be-trained appearance information feature sequence including a plurality of to-be-trained appearance information features;

obtaining an actual motion information feature sequence according to the optical flow image sequence corresponding to the to-be-trained video file, the actual motion information feature sequence including T actual motion information features, T being an integer greater than 1;

obtaining a predicted motion information feature sequence corresponding to the to-be-trained appearance information feature sequence by using a to-be-trained motion prediction network model, the predicted motion information feature sequence including T predicted motion information features;

determining a model parameter according to the actual motion information feature sequence and the predicted motion information feature sequence; and training the to-be-trained motion prediction network model by using the model parameter, to obtain a motion prediction network model; and the bus system being configured to connect the memory and the processor, to enable the memory and the processor to perform communication.

A seventh aspect of this application provides a computer-readable storage medium, the computer-readable storage medium storing instructions, the instructions, when run on a computer, causing the computer to perform the methods according to the foregoing aspects.

DESCRIPTION OF EMBODIMENTS

Figure 1:
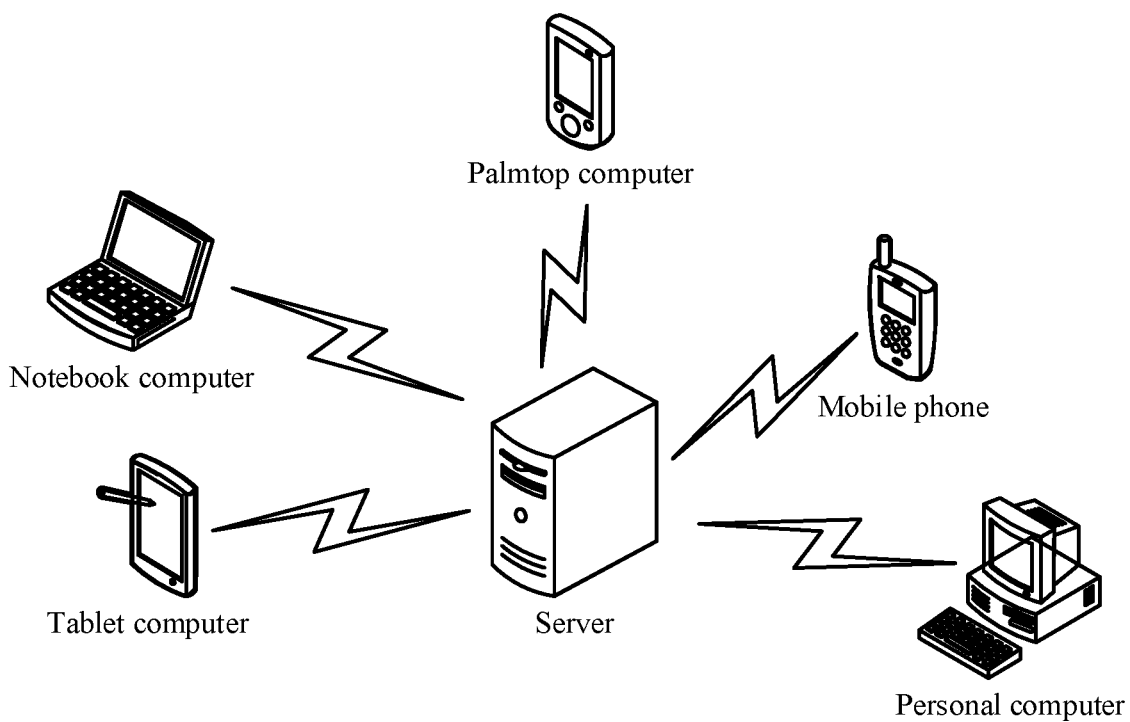
FIG. 1 is a schematic architectural diagram of a video classification system according to an embodiment of this application.

Embodiments of this application provide a video classification method, and a model training method and apparatus, which can implement automatic classification of a video, without a need to calculate optical flow images according to appearance information features of the video to calculate motion information features by using the optical flow images. Instead, the motion information features corresponding to the appearance information features can be directly obtained by using a motion prediction network model, so as to save computing time and resources, thereby improving data processing efficiency.

In the specification, claims, and accompanying drawings of this application, the terms "first", "second", "third", "fourth", and the like (if existing) are intended to distinguish between similar objects rather than describe a specific order or sequence. It may be understood that the data termed in such a way is interchangeable in proper circumstances, so that the embodiments of this application described herein, for example, can be implemented in other orders than the order illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that this application may be applied to a scenario of video classification, and video classification may be that: a "tag" is attached to a video, so that the video belongs to one or a plurality of classes. In a video database with a large quantity of videos, classification and tags are an important basis for video searching. Whether a video can be watched by more people and whether the video is popular depend much on whether classification and tag writing are proper. Video classification has covered the Internet, television, mobile terminals, and the like, has content forms such as film and television, variety shows, and information, and runs through links such as video content production, playback, and releasing, thereby becoming a true Internet television media, and influencing the video industry structure and the big structure of the omni-media age. Specifically, the video classification method provided in this application may be applied to several types of video websites as follows:

A first type of video web sites are peer-to-peer (P2P) network television, that is, to implement transmission of programs by using a P2P technology. The greatest advantage of the technology is that each user may directly be connected to another user, so as to break through a bottleneck of servers and bandwidths, and a larger quantity of users indicates a better network interconnection effect. Features of this type of video websites include, but not limited to: operation costs are low, which is mainly manifested in low costs for a server and a bandwidth; a P2P plug-in or software needs to be installed; a smoothness of a live streaming program is higher than that of an on-demand program; a quantity of programs is limited; contents are actively released, that is, the contents are registered in a server of the video website; and a specific buffer period is required before a program is watched.

A second type of video websites are P2P downloading and watching video websites, that is, to implement synchronization of watching and downloading of film and television files. The technology remedies a shortcoming that in conventional P2P downloading, a file can only be watched after downloading completed. Features of this type of video websites include, but not limited to: the video websites are shown as intermediate platforms, that is, most contents are provided by netizens, and then are shared and downloaded, and there are also servers that release contents; P2P software needs to be installed; on-demand programs are the majority; and a quantity of programs is large.

A third second type of video websites are video sharing websites, that is, user generated content (UGC) websites. The largest feature of this type of websites is that a solid-state memory and animation editor video (flash video, FLASH FLV) playback technology are used, and the websites have functions such as video uploading, sharing, and review. Features of this type of video websites include, but not limited to: user experience is relatively good, no software needs to be installed, and click-and-play can be implemented; occupation for a server and a bandwidth is relatively large, and operating costs are relatively high; there are a large quantity of contents and most of the contents are provided by netizens; and profitability is relatively weak.

A fourth type of video websites are telecommunication platforms, that is, video websites set up by a telecommunication operator. Features of this type of video websites include, but not limited to: charging manners such as pay-per-view and monthly payment are used, and fee payment can be performed in a manner of a mobile phone fee, a telephone fee, a bandwidth, or the like; a telecommunication operator provides a server and a bandwidth, and a program provider provides contents or provides a website platform and contents as a whole; quality of programs is uneven; and this type of video websites are an early network video presentation pattern in China.

A fifth type of video websites are video search websites, that is, websites providing a video search service. Features of this type of video websites include, but not limited to: the Internet is searched for a video resource; difficulty of a video search technology is high, development costs are relatively high, and a massive index database needs to be established for relatively advanced frame search; and for some video websites and search engines, a video search function has been developed.

A sixth type of video websites are vertical video websites, that is, using one industry as a center, and providing professional video services. Features of this type of video websites include, but not limited to: contents are limited in one industry, and user location is accurate; most video playbacks are carriers, and the websites depends more on a review pattern and electronic commerce patterns such as a business to customer (B2C) pattern and a customer to customer (C2C) pattern.

A seventh type of video websites are portal video websites, that is, video channels set up for portals. Features of this type of video websites include, but not limited to: a plurality of video presentation patterns are mixed; profitability and copyright purchasing power based on the video websites are relatively strong; a combination degree with another product of a portal thereof is high, thereby having a combination advantage; and operation of the video websites is not so delicate as professional video websites.

For ease of understanding, this application provides a video classification method. The method is applicable to a video classification system shown in FIG. 1. FIG. 1 is a schematic architectural diagram of a video classification system according to an embodiment of this application. As shown in the figure, the video classification apparatus may be deployed on a server, or may be deployed on a client having a relatively high computing capability. That is, the video classification apparatus may be deployed on a computer device. An example in which the video classification apparatus is deployed on a server is used for description below. The server extracts appearance information features according to RGB image frames of a video file, then predicts motion information features corresponding to optical flow images of the video according to the extracted appearance information features, and predicts a motion information feature sequence of the video according to an appearance information feature sequence without explicitly calculating the optical flow images, and performs feature description on the video with reference to the appearance information feature sequence of the video, thereby improving accuracy of video classification, and improving performance of a current video classification model. A method for extracting video features provided in this application may further be applied to a server side or cloud with reference to various feature classification frameworks, so as to automatically performing multi-class classification on videos in a video database.

The client is deployed on a terminal device. The terminal device includes, but is not limited to, a tablet computer, a notebook computer, a palmtop computer, a mobile phone, a speech interaction device, and a personal computer (PC), and is not limited herein. The speech interaction device includes, but is not limited to a smart sound and a smart home appliance.

Figure 2:
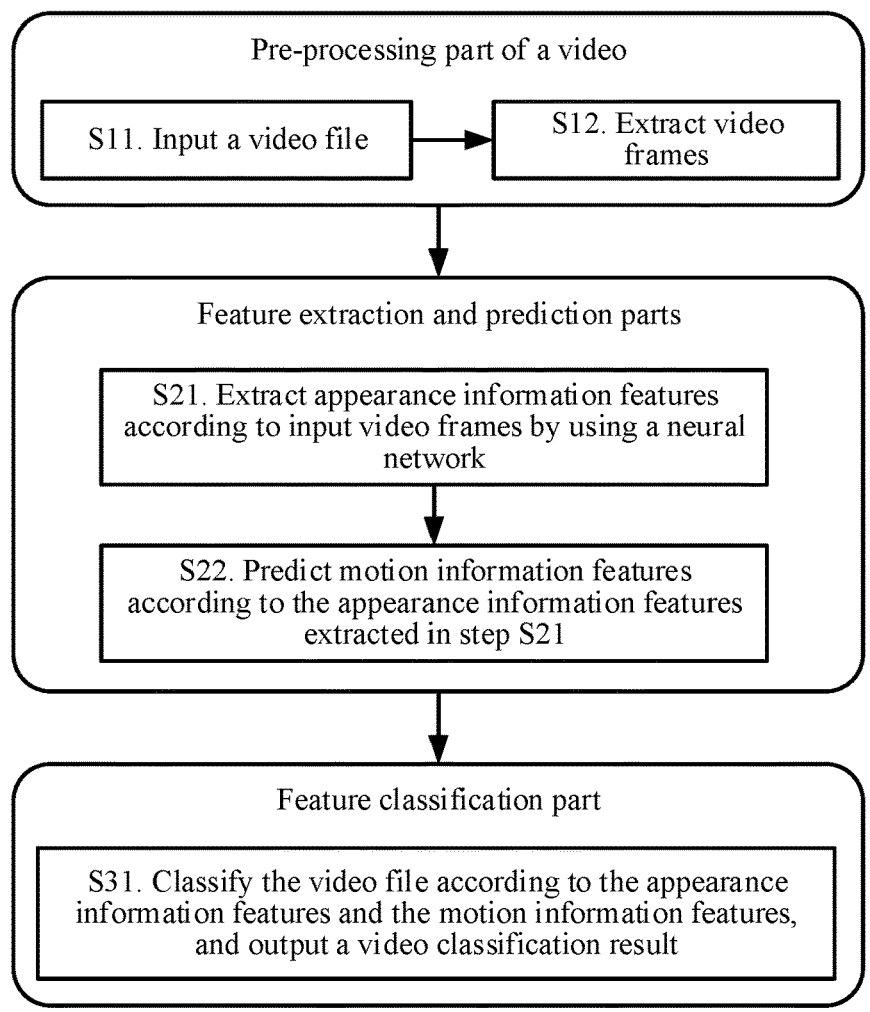
FIG. 2 is a flowchart of video classification based on appearance information features and motion information features according to an embodiment of this application.

For ease of description, FIG. 2 is a flowchart of video classification based on appearance information features and motion information features according to an embodiment of this application. As shown in the figure, the video classification method provided in this application may be divided into three parts, which are respectively video pre-processing, feature extraction and prediction, and feature classification. Functions and processes of the parts are described below, which are specifically:

Step S11: Obtain a video file.

Step S12: Encode the inputted video file, to obtain RGB image frames corresponding to the video file. It can be understood that a format of the RGB image frames is not limited.

Step S21: Extract, with the RGB image frames as an input of an image classification network model, appearance information features of each of the RGB image frames by using the image classification network model, to form an appearance information feature sequence of the video file.

Step S22: Predict, with the appearance information feature sequence as an input of a motion prediction network model, a motion information feature sequence of the video file by using the motion prediction network model.

Step S31: Classify the video file with the motion information feature sequence and the appearance information feature sequence as an input of a video classification network model, to obtain class information of the video file.

Figure 3:
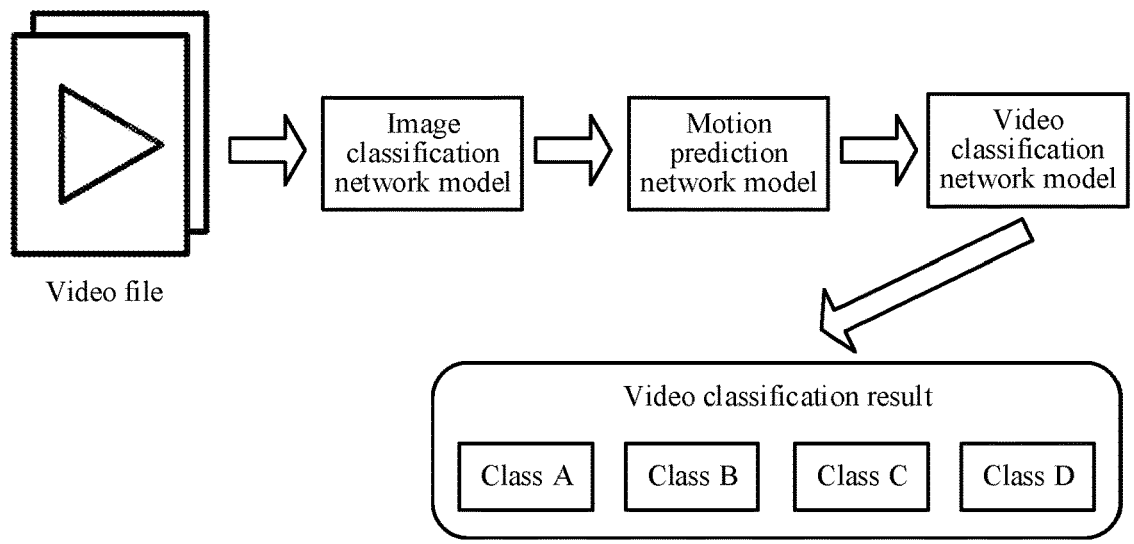
FIG. 3 is a schematic diagram of an application scenario of video classification according to an embodiment of this application.

Based on the above process, an application scenario of video classification provided in this application is shown in FIG. 3. FIG. 3 is a schematic diagram of an application scenario of video classification according to an embodiment of this application. As shown in the figure, by using a video classification service as an example, the server receives a video file uploaded by a user, and processes the video file, to obtain RGB image frames. The RGB image frames are inputted into an image classification network model, to output an appearance information feature sequence; then the appearance information feature sequence is inputted into a motion prediction network model, to output a motion information feature sequence; then the appearance information feature sequence and the motion information feature sequence are inputted into a video classification network model, to output a video classification result, that is, the video file belongs to at least one class of a class A, a class B, a class C, and a class D.

In the foregoing embodiment shown in FIG. 2, a description is provided by using an example in which the video classification process is implemented by using a plurality of models. In a possible implementation, the video classification process may not be implemented by using the models. Correspondingly, in the foregoing steps, corresponding steps may be directly performed instead of being performed by using a neural network, the image classification network model, the motion prediction network model, and the video classification network model. This embodiment of this application does not limit a specific implementation.

Figure 4:
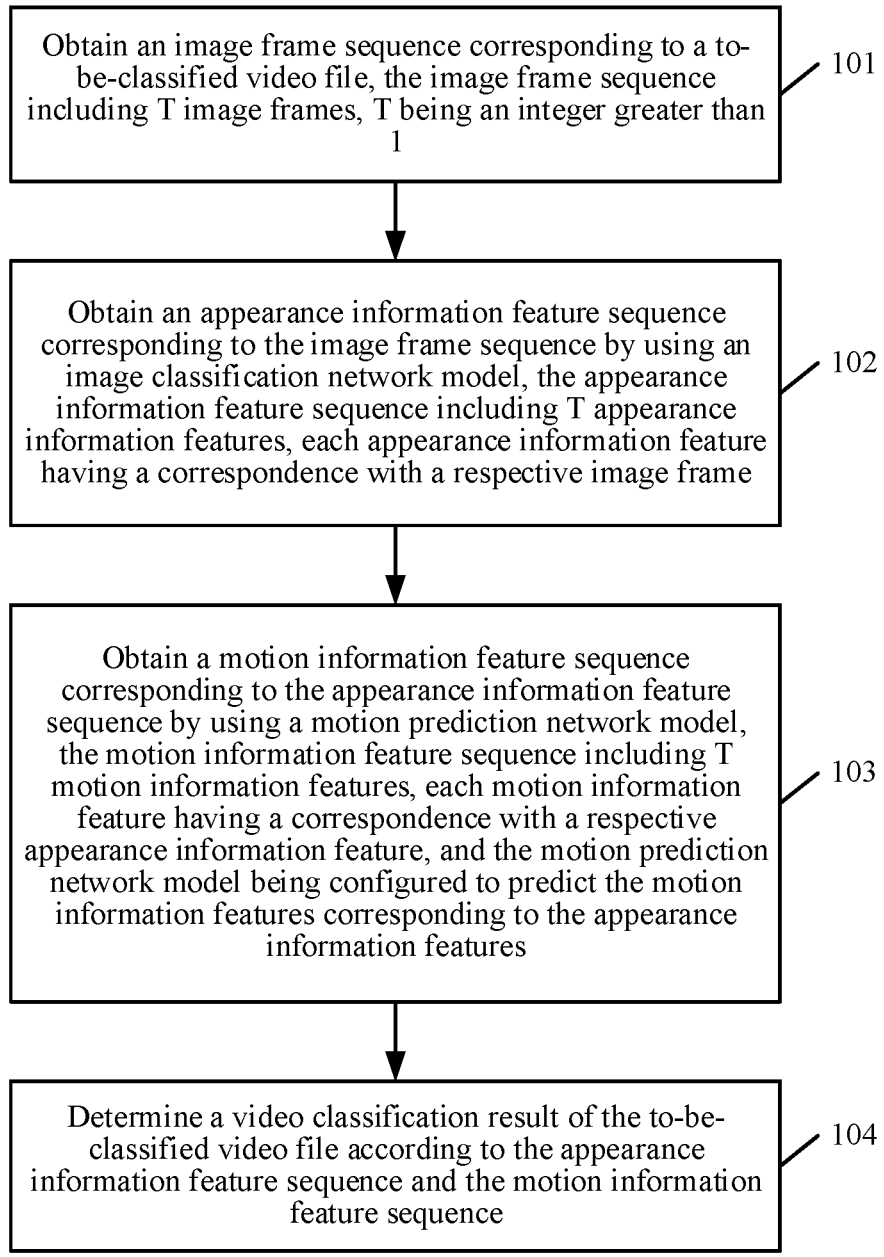
FIG. 4 is a schematic diagram of an embodiment of a video classification method according to an embodiment of this application.

The video classification method in this application is introduced below with reference to the foregoing introduction. Referring to FIG. 4, an embodiment of the video classification method in the embodiments of this application includes the following steps:

101: Obtain an image frame sequence corresponding to a to-be-classified video file, the image frame sequence including T image frames, T being an integer greater than 1.

In this embodiment, a video classification apparatus obtains a to-be-classified video file. The video classification apparatus may be deployed on a server, or may be deployed on a terminal device. The to-be-classified video file may be a video uploaded by using a client, or may be a video prestored in a database. This is not limited herein. The video classification apparatus decodes the to-be-classified video file, to obtain an image frame sequence, the image frame sequence including T image frames, T being an integer greater than 1 and representing a total quantity of image frames in the image frame sequence, one image frame being corresponding to one time point, that is, the T image frames being corresponding to T time points.

102: Obtain an appearance information feature sequence corresponding to the image frame sequence by using an image classification network model, the appearance information feature sequence including T appearance information features, each appearance information feature having a correspondence with one of the T image frames.

In this embodiment, the video classification apparatus uses the T image frames in the image frame sequence as an input of the image classification network model, and outputs the appearance information feature sequence by using the image classification network model, the appearance information feature sequence including T appearance information features, and each image frame being corresponding to one appearance information feature.

Step 102 is a process of obtaining the appearance information feature sequence corresponding to the image frame sequence. In step 102, a description is provided by merely using an example in which the appearance information feature sequence is obtained by using the image classification network model. The process may alternatively not be implemented by using the image classification network model. This is not limited in this embodiment of this application.

103: Obtain a motion information feature sequence corresponding to the appearance information feature sequence by using a motion prediction network model, the motion information feature sequence including T motion information features, each motion information feature having a correspondence with one of the T appearance information feature, and the motion prediction network model being configured to predict the motion information features corresponding to the appearance information features.

In this embodiment, the video classification apparatus uses the appearance information feature sequence as an input of the motion prediction network model, and outputs the motion information feature sequence by using the motion prediction network model, the motion information feature sequence including T motion information features, that is, each appearance information feature being corresponding to one motion information feature, and each image frame also being corresponding to one motion information feature.

Step 103 is a process of obtaining the motion information feature sequence corresponding to the appearance information feature sequence. In step 103, a description is provided by merely using an example in which the motion information feature sequence is obtained by using the motion prediction network model. The process may alternatively not be implemented by using the motion prediction network model. This is not limited in this embodiment of this application.

104: Determine a video classification result of the to-be-classified video file according to the appearance information feature sequence and the motion information feature sequence.

In this embodiment, the video classification apparatus may classify the video file according to the appearance information feature sequence and the motion information feature sequence, to output the video classification result of the to-be-classified video file. Generally, the to-be-classified video file corresponds to at least one video classification result. For example, the to-be-classified video file may belong to videos of a class A. In another example, the to-be-classified video file may simultaneously belong to videos of the class A and videos of a class B.

In this embodiment of this application, a video classification method is provided. The method includes: first obtaining an image frame sequence corresponding to a to-be-classified video file, the image frame sequence including T image frames, T being an integer greater than 1; then obtaining an appearance information feature sequence corresponding to the image frame sequence by using an image classification network model, the appearance information feature sequence including T appearance information features, each appearance information feature having a correspondence with one of the T image frames; subsequently obtaining a motion information feature sequence corresponding to the appearance information feature sequence by using a motion prediction network model, the motion information feature sequence including T motion information features, each motion information feature having a correspondence with one of the T appearance information feature, and the motion prediction network model being configured to predict the motion information features corresponding to the appearance information features; and finally determining a video classification result of the to-be-classified video file according to the appearance information feature sequence and the motion information feature sequence. In the foregoing manner, automatic classification of a video can be implemented, without a need to calculate optical flow images according to appearance information features of the video to calculate motion information features by using the optical flow images. Instead, the motion information features corresponding to the appearance information features can be directly obtained by using a motion prediction network model, so as to save computing time and resources, thereby improving data processing efficiency.

In some embodiments, based on the embodiment corresponding to FIG. 3, in a first optional embodiment of the video classification method provided in the embodiments of this application, the obtaining an image frame sequence corresponding to a to-be-classified video file may include:

obtaining the to-be-classified video file; and decoding the to-be-classified video file, to obtain the image frame sequence, a sampling frequency for each image frame being the same.

In this embodiment, a method for obtaining the image frame sequence is provided. First, the video classification apparatus needs to obtain the to-be-classified video file, then decodes the to-be-classified video file with a specific sampling frequency (for example, one frame per second) by using an audio and video decoding tool, to obtain an RGB image frame sequence and an audio signal sequence.

It can be understood that video formats of the to-be-classified video file include, but not limited to, a motion picture experts group (MPEG) format, an audio video interleaved (AVI) format, an advanced streaming format (ASF), a Windows media video (WMV) format, a 3rd generation partnership project (3GP) file format, a Matroska multimedia container (MKV) file format, a streaming media format (flash video), and a RealMedia variable bitrate (RMVB) file format.

It can be understood that the audio and video decoding tool may specifically be fast forward MPEG (ffmpeg). ffmpeg is an open source computer program that can be used for recording and converting digital audios and videos, and can convert the audios and videos into flows. A sampling frequency used by the audio and video decoding tool is also referred to as a sampling rate or a sampling speed. The sampling frequency defines a quantity of samples extracted from continuous signals per second and forming discrete signals, which is represented by using hertz (Hz). A reciprocal of the sampling frequency is referred to as a sampling period or sampling time, which is a time interval between sampling.

It can be understood that RGB image frame formats in the RGB image frame sequence include, but not limited to, a bitmap (BMP) format, a personal computer exchange (PCX) format, a tag image file format (TIFF), a graphics interchange format (GIF), a joint photographic expert group (JPEG) format, a tagged graphics (TGA) format, an exchangeable image file format (EXIF), a kodak flash PiX (FPX) format, a scalable vector graphics (SVG) format, a portable network graphics (PNG) format, a Windows metafile format (WMF), an encapsulated post script (EPS) format, a high dynamic range imaging (HDRI) format, and a drawing exchange format (DXF).

In addition, in this embodiment of this application, a manner in which the video classification apparatus obtains the image frame sequence corresponding to the to-be-classified video file is introduced. That is, the to-be-classified video file is first obtained, then the to-be-classified video file is decoded, to obtain the image frame sequence, a sampling frequency for each image frame being the same. In the foregoing manner, the video file can be decoded according to a set sampling frequency, to obtain the corresponding image frame sequence, so as to facilitate subsequent processing, thereby improving feasibility and operability of the solution.

In some embodiments, based on the embodiment corresponding to FIG. 3, in a second optional embodiment of the video classification method provided in the embodiments of this application, the obtaining an appearance information feature sequence corresponding to the image frame sequence by using an image classification network model may include:

obtaining an appearance information feature corresponding to a $t^{th}$ image frame by using the image classification network model, t being an integer greater than or equal to 1 and less than or equal to T; and generating the appearance information feature sequence according to the T appearance information features when an appearance information feature corresponding to each of the T image frames has been obtained.

In this embodiment, a method for obtaining the appearance information feature sequence corresponding to the image frame sequence by using the image classification network model is introduced. First, each image frame in the image frame sequence is inputted into the image classification network model, each image frame including appearance information, the appearance information including, but not limited to, information that can be directly obtained from the image, such as a shape, a size, a color, and a class of an object. An appearance information feature corresponding to each image frame is outputted by using the image classification network model, the T image frames being corresponding to T appearance information features, and the T appearance information features forming the appearance information feature sequence. The appearance information feature refers to a feature obtained after feature extraction is performed on an image by using a convolutional neural network. Because the image includes appearance information, and the appearance information is represented by using a feature. The obtained feature is an appearance information feature.

Specifically, appearance information features of the image frames in the to-be-classified video file are represented by using a currently common video feature extraction method (for example, a convolutional neural network method or a recurrent neural network method). For the to-be-classified video file having the T image frames, an appearance information feature sequence $\{x_{video}^t\}_{t=1}^{T}$ can be obtained. The video feature extraction method used on this application may be an Inception-V4 deep neural network model. The Inception-V4 deep neural network model is a convolutional neural network image classification model. In this solution, an Inception-V4 model parameter pre-trained on an image network (ImageNet) dataset is used to give an input image, and obtain a deep neural network feature corresponding to the image. The feature is outputted according to a parameter in the network and final features of a convolutional and non-linear activation function thereof and the like. Dimensions of the feature after processing based on a principal component analysis algorithm are 1024 dimensions.

The principal component analysis algorithm is a feature dimension reduction algorithm. For example, an input feature is 4096-dimensional, and 128 maximum directions of a model of the feature are obtained through principal component analysis, then projections of the feature in the 128 directions are obtained, to obtain a 128-dimensional feature after dimension reduction of the feature.

It can be understood that in an actual application, in addition to the Inception-V4 deep neural network model, another type of deep neural network model such as a residual network (ResNet), an Inception-V3 deep neural network model, or a dual path network (DPN) may alternatively be used. This is merely an example herein, and is not to be construed as a limitation on this application.

In addition, in this embodiment of this application, a method for obtaining the appearance information feature sequence by using the image classification network model is provided. That is, the video classification apparatus obtains the appearance information feature corresponding to the $t^{th}$ image frame by using the image classification network model, and when an appearance information feature corresponding to each of the T image frames has been obtained, the video classification apparatus generates the appearance information feature sequence according to the T appearance information features. In the foregoing manner, the appearance information feature sequence of the video file can be directly outputted by using the image classification network model, without a need to manually extract the feature sequence. Therefore, on one hand, feature prediction accuracy can be improved; on the other hand, labor costs are saved, and feature extraction efficiency can further be improved.

In some embodiments, based on the embodiment corresponding to FIG. 3, in a third optional embodiment of the video classification method provided in the embodiments of this application, the obtaining a motion information feature sequence corresponding to the appearance information feature sequence by using a motion prediction network model may include:

obtaining a $t^{th}$ appearance information feature corresponding to an $i^{th}$ step, i being an integer greater than or equal to 1, and t being an integer greater than or equal to 1 and less than or equal to T;

obtaining a $(t+1)^{th}$ motion information feature and a $(t-1)^{th}$ motion information feature corresponding to an $(i-1)^{th}$ step;

determining a $t^{th}$ motion information feature corresponding to the $i^{th}$ step according to the $t^{th}$ appearance information feature, the $(t+1)^{th}$ motion information feature, and the $(t-1)^{th}$ motion information feature by using the motion prediction network model; and generating the motion information feature sequence according to the T motion information features when a motion information feature corresponding to each of the T appearance information features has been obtained.

In this embodiment, a manner of generating the motion information feature sequence is introduced. A given sequence $\{x_{video}^t\}_{t=1}^{T}$ of T D-dimensional appearance information features belonging to a video is used as an input, T being a quantity time dimensions of the to-be-classified video file, and D-dimensional means a feature dimension (length) of a single feature. For example, a position of an object may be described by using a three-dimensional (x, y, z) feature. The appearance information feature herein means a feature obtained by using a convolutional neural network, and is 1024-dimensional. For different convolutional neural networks, dimensions obtained through calculation may be different, which may be adjusted in a set manner.

For example, for a to-be-classified video file with a length of 60 seconds, features are extracted with a frequency of one feature per second, then T=60 D-dimensional features are extracted, and time dimensions thereof are arranged in chronological order. In this application, a motion prediction network model is provided to predict a motion information feature sequence $\{S_{motion}^t\}_{t=1}^{T}$, to obtain an appearance information feature sequence and a motion information feature sequence of the to-be-classified video file, and then video classification is performed. Motion information may specifically include information related to motion such as a motion direction and a motion intensity of an object.

Motion information features at a previous time point and at a later time point need to be simultaneously received for calculation of a motion information feature, assuming that a current time point is t, the previous time point is a $(t-1)^{th}$ time point, and the later time point is a $(t+1)^{th}$ time point. A $(t+1)^{th}$ motion information feature and a $(t-1)^{th}$ motion information feature are used as an input, to estimate a motion information feature at the current time point, which cannot be directly obtained in an implementation process. Therefore, the estimation is performed in a recursive manner in this application. It is assumed that a current step is i, a last step is represented as an $(i-1)^{th}$ step. A $t^{th}$ appearance information feature corresponding to the $i^{th}$ step, a motion information feature at the $(t-1)^{th}$ time point and a motion information feature at the $(t+1)^{th}$ time point that are calculated in the $(i-1)^{th}$ step are jointly inputted into the motion prediction network model. The motion prediction network model outputs a $t^{th}$ motion information feature corresponding to the $i^{th}$ step. Similarly, a motion information feature corresponding to each of the T appearance information features is obtained, and T motion information features form a motion information feature sequence.

In addition, in this embodiment of this application, a method for obtaining the motion information feature sequence corresponding to the appearance information feature sequence by using the motion prediction network model is provided. That is, the video classification apparatus first obtains the $t^{th}$ appearance information feature corresponding to the $i^{th}$ step, then obtains the $(t+1)^{th}$ motion information feature and the $(t-1)^{th}$ motion information feature corresponding to the $(i-1)^{th}$ step, subsequently determines the $t^{th}$ motion information feature corresponding to the $i^{th}$ step according to the $t^{th}$ appearance information feature, the $(t+1)^{th}$ motion information feature, and the $(t-1)^{th}$ motion information feature by using the motion prediction network model, and generates the motion information feature sequence according to the T motion information features when a motion information feature corresponding to each of the T appearance information features has been obtained. In the foregoing manner, the motion information feature sequence can be directly obtained by using the motion prediction network model, to automatically classify the video file, so as to complete recognition on video contents, thereby greatly reducing workloads of screening personnel for video contents. In addition, for applications of the video recommendation aspect, user personalized recommendation can be performed according to video classes, thereby improving user experience and enriching product contents.

In some embodiments, based on the third embodiment corresponding to FIG. 3, in a fourth optional embodiment of the video classification method provided in the embodiments of this application, the determining a $t^{th}$ motion information feature corresponding to the $i^{th}$ step according to the $t^{th}$ appearance information feature, the $(t+1)^{th}$ motion information feature, and the $(t-1)^{th}$ motion information feature may include:

calculating a $(t+1)^{th}$ update gate vector and a $(t-1)^{th}$ update gate vector corresponding to the $i^{th}$ step according to the $t^{th}$ appearance information feature, the $(t+1)^{th}$ motion information feature, and the $(t-1)^{th}$ motion information feature by using an update gate of the motion prediction network model;

calculating a $(t+1)^{th}$ output gate vector and a $(t-1)^{th}$ output gate vector corresponding to the $i^{th}$ step according to the $t^{th}$ appearance information feature, the $(t+1)^{th}$ motion information feature, and the $(t-1)^{th}$ motion information feature by using an output gate of the motion prediction network model;

calculating a $t^{th}$ hidden state feature vector corresponding to the $i^{th}$ step according to the $t^{th}$ appearance information feature, the $(t+1)^{th}$ motion information feature, the $(t-1)^{th}$ motion information feature, the $(t+1)^{th}$ update gate vector, and the $(t-1)^{th}$ update gate vector by using a hidden state of the motion prediction network model; and calculating the $t^{th}$ motion information feature corresponding to the $i^{th}$ step according to the $t^{th}$ hidden state feature vector and the $(t+1)^{th}$ output gate vector and the $(t-1)^{th}$ output gate vector corresponding to the $i^{th}$ step by using a final output layer of the motion prediction network model.

In this embodiment, for the sequence $\{x_{video}{}^t\}_{t=1}^{T}$ of the T D-dimensional inputted appearance information features, the motion prediction network model expects to find a method for mapping the appearance information feature sequence to a motion information feature sequence, so that the network model can predict a motion information feature sequence $\{S_{motion}{}^t\}_{t=1}^{T}$ according to the appearance information feature sequence. The motion prediction network model f provided in this solution is mainly divided into fourth parts, including a hidden state, an update gate, and output gate, and a final output layer.

Figure 5:
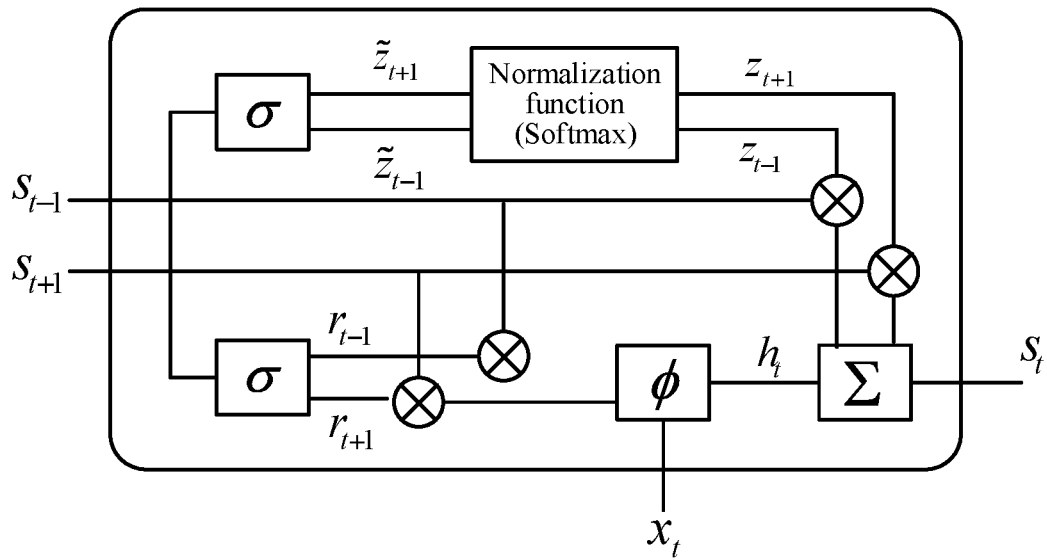
FIG. 5 is a schematic diagram of a structural unit of a motion prediction network model according to an embodiment of this application.

For ease of understanding, FIG. 5 is a schematic diagram of a structural unit of a motion prediction network model according to an embodiment of this application. As shown in the figure, the $t^{th}$ appearance information feature $x_t$ corresponding to the $i^{th}$ step is used as an input of the update gate, and the $(t+1)^{th}$ motion information feature $s_{t+1}$ and the $(t-1)^{th}$ motion information feature $t_{t-1}$ corresponding to the $(i-1)^{th}$ step are simultaneously used as an input of the update gate, to output the $(t-1)^{th}$ update gate vector $r_{t-1}$ and the $(t+1)^{th}$ update gate vector $r_{t+1}$ corresponding to the $i^{th}$ step.

The $t^{th}$ appearance information feature $x_t$ corresponding to the $i^{th}$ step is used as an input of the output gate, and the $(t+1)^{th}$ motion information feature $s_{t+1}$ and the $(t-1)^{th}$ motion information feature $s_{t-1}$ corresponding to the $(i-1)^{th}$ step are simultaneously used as an input of the output gate, to output the $(t-1)^{th}$ output gate vector $z_{t-1}$ and the $(t+1)^{th}$ output gate vector $z_{t+1}$ corresponding to the $i^{th}$ step.

The $t^{th}$ appearance information feature $x_t$ corresponding to the $i^{th}$ step is used as an input of the hidden state, the $(t+1)^{th}$ motion information feature $s_{t+1}$ and the $(t-1)^{th}$ motion information feature $s_{t-1}$ corresponding to the $(i-1)^{th}$ step are simultaneously used as an input of the hidden state, and the $(t+1)^{th}$ update gate vector $r_{t+1}$ and the $(t-1)^{th}$ update gate vector $r_{t-1}$ corresponding to the $(i-1)^{th}$ step are also used as an input of the hidden state, to output the $t^{th}$ hidden state feature vector $h_t$ corresponding to the $i^{th}$ step.

The $t^{th}$ hidden state feature vector $h_t$ corresponding to the $i^{th}$ step is used as an input of the final output layer, and the $(t-1)^{th}$ output gate vector $z_{t-1}$ and the $(t+1)^{th}$ output gate vector $z_{t+1}$ corresponding to the $i^{th}$ step are simultaneously used as an input of the final output layer, to output the $t^{th}$ motion information feature $s_t$ corresponding to the $i^{th}$ step.

Figure 6:
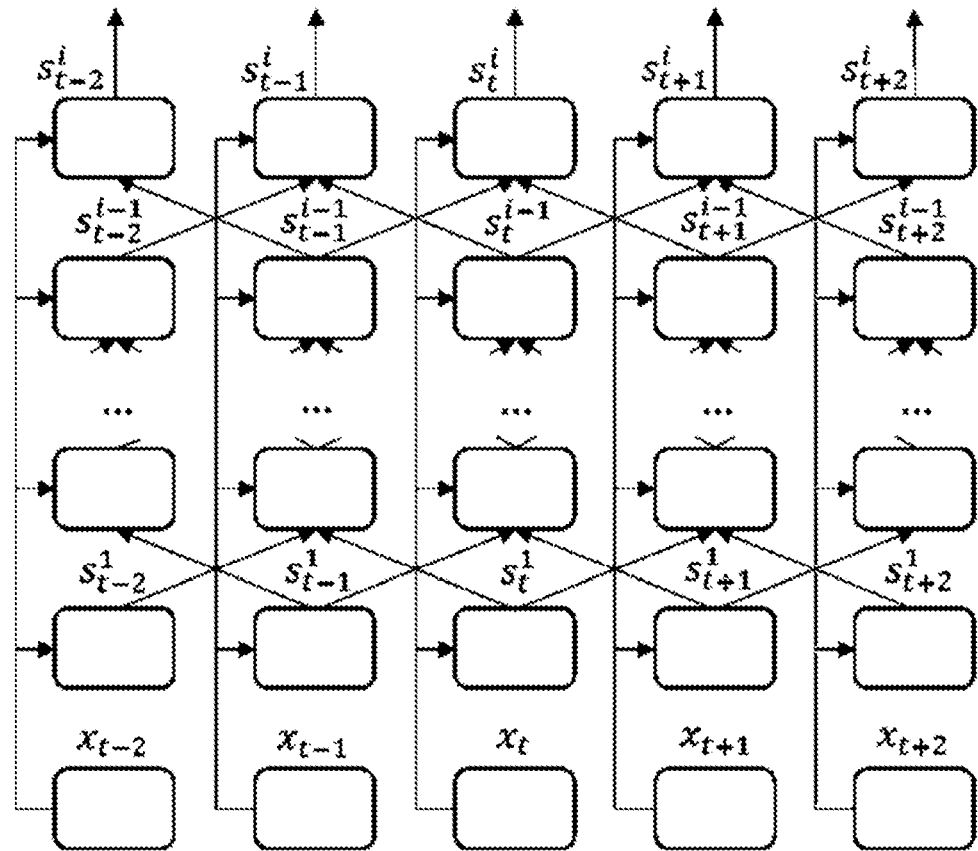
FIG. 6 is a recursive unfolded schematic diagram of a motion prediction network model according to an embodiment of this application.

It is to be understood that the estimation is performed in a recursive manner in this application. The $t^{th}$ appearance information feature corresponding to the $i^{th}$ step, the motion information feature at the $(t-1)^{th}$ time point and the motion information feature at the $(t+1)^{th}$ time point that are calculated in the $(i-1)^{th}$ step are jointly inputted into the motion prediction network model. The motion prediction network model outputs the $t^{th}$ motion information feature corresponding to the $i^{th}$ step. For ease of understanding, FIG. 6 is a recursive unfolded schematic diagram of a motion prediction network model according to an embodiment of this application. As shown in the figure, when a motion information feature $s_t$ corresponding to the $i^{th}$ step is predicted, the following motion prediction network model may be used:

$$s_t^i = f(x_t, s_{t+1}^{i-1}, s_{t-1}^{i-1});$$

where $s_{t-1}^{i-1}$ represents the $(t-1)^{th}$ motion information feature corresponding to the $(i-1)^{th}$ step, and $s_{t+1}^{i-1}$ represents the $(t+1)^{th}$ motion information feature corresponding to the $(i-1)^{th}$ step. The motion information feature sequence $\{S_{motion}{}^t\}_{t=i}^{T}$ is predicted in a recursive calculation manner. During the calculation, an initial value of a motion information feature is a 0 vector.

In addition, in this embodiment of this application, a method for determining the $t^{th}$ motion information feature corresponding to the $i^{th}$ step according to the $t^{th}$ appearance information feature, the $(t+1)^{th}$ motion information feature, and the $(t-1)^{th}$ motion information feature is provided. In the foregoing manner, the design for the motion prediction network model is mainly divided into four parts, which are respectively a hidden state, an update gate, an output gate, and a final output layer. In this way, calculation may be separately performed for the parts, to calculate the motion information features, thereby ensuring feasibility and operability of the solution.

In some embodiments, based on the fourth embodiment corresponding to FIG. 3, in a fifth optional embodiment of the video classification method provided in the embodiments of this application, the calculating a $(t+1)^{th}$ update gate vector and a $(t-1)^{th}$ update gate vector corresponding to the $i^{th}$ step according to the $t^{th}$ appearance information feature, the $(t+1)^{th}$ motion information feature, and the $(t-1)^{th}$ motion information feature by using an update gate of the motion prediction network model may include:

calculating the $(t+1)^{th}$ update gate vector and the $(t-1)^{th}$ update gate vector in the following manner:

$$r_{t-1} = \sigma(W_r x_t + U_{r,t-1} s_{t-1}^{i+1});$$

$$r_{t+1} = \sigma(W_r x_t + U_{r,t+1} s_{t+1}^{i-1});$$

where $r_{t-1}$ represents the $(t-1)^{th}$ update gate vector corresponding to the $i^{th}$ step, t represents a $t^{th}$ time point, $r_{t+1}$ represents the $(t+1)^{th}$ update gate vector corresponding to the $i^{th}$ step, $\sigma()$ represents a rectified linear unit, represents a first parameter matrix, $U_{r,t-1}$ represents a second parameter matrix corresponding to the $(t-1)^{th}$ update gate vector, $U_{r,t+1}$ represents a third parameter matrix corresponding to the $(t+1)^{th}$ update gate vector, $x_t$ represents the $t^{th}$ appearance information feature, $s_{t-1}^{i-1}$ represens the $(t-1)^{th}$ motion information feature corresponding to the $(i-1)^{th}$ step, and $s_{t+1}^{i-1}$ represents the $(t+1)^{th}$ motion information feature corresponding to the $(i-1)^{th}$ step;

the calculating a $(t+1)^{th}$ output gate vector and a $(t-1)^{th}$ output gate vector corresponding to the $i^{th}$ step according to the $t^{th}$ appearance information feature, the $(t+1)^{th}$ motion information feature, and the $(t-1)^{th}$ motion information feature by using an output gate of the motion prediction network model may include:

calculating the $(t+1)^{th}$ output gate vector and the $(t-1)^{th}$ output gate vector in the following manner:

$$[z_{t+1}, z, z_{t-1}] = \text{soft max}([\tilde{z}_{t+1}, 1, \tilde{z}_{t-1}]);$$

$$\tilde{z}_{t-1} = \sigma(W_z x_t + U_{z,t-1} s_{t-1}^{i-1});$$

$$\tilde{z}_{t+1} = \sigma(W_z x_t + U_{z,t+1} s_{t+1}^{i-1});$$

where $z_{t+1}$ represents the $(t+1)^{th}$ output gate vector corresponding to the $i^{th}$ step, $z_{t-1}$ represents the $(t-1)^{th}$ output gate vector corresponding to the $i^{th}$ step, z represents a preset output gate vector, $\tilde{Z}_{t-1}$ represents a $(t-1)^{th}$ to-be-processed output gate vector corresponding to the $i^{th}$ step, $\tilde{Z}_{t+1}$ represents a $(t+1)^{th}$ to-be-processed output gate) vector corresponding to the $i^{th}$ step, soft max(0 represents a normalization function, $W_z$ represents a fourth parameter matrix, $U_{z,t-1}$ represents a fifth parameter matrix corresponding to the $(t-1)^{th}$ output gate vector, and $U_{z,t+1}$ represents a sixth parameter matrix corresponding to the $(t+1)^{th}$ output gate vector;

the calculating a $t^{th}$ hidden state feature vector corresponding to the $i^{th}$ step according to the $t^{th}$ appearance information feature, the $(t+1)^{th}$ motion information feature, the $(t-1)^{th}$ motion information feature, the $(t+1)^{th}$ update gate vector, and the $(t-1)^{th}$ update gate vector by using a hidden state of the motion prediction network model may include:

calculating the $t^{th}$ hidden state feature vector in the following manner:

$$h_t = \phi(W_h x_t + U_h [s_{t+1}^{i-1} \circ r_{t+1}, s_{t-1}^{i-1} \circ r_{t-1}]^T);$$

where $h_t$ represents the $t^{th}$ hidden state feature vector corresponding to the $i^{th}$ step, $\phi(\ )$ represents a sigmoid function, $W_h$ represents a seventh parameter matrix, $U_h$ represents an eighth parameter matrix, $[\ ]^T$ represents a matrix transpose, and $\circ$ represents dot multiplication; and the calculating the $t^{th}$ motion information feature corresponding to the $i^{th}$ step according to the $t^{th}$ hidden state feature vector, and the $(t+1)^{th}$ output gate vector and the $(t-1)^{th}$ output gate vector corresponding to the $i^{th}$ step by using a final output layer of the motion prediction network model may include:

calculating the $t^{th}$ motion information feature in the following manner:

$$s_t^i = z \circ h_t + z_{t-1} \circ s_{t-1}^{i-1} + z_{t+1} \circ s_{t+1}^{i-1};$$

where $s_t^1$ represents the $t^{th}$ motion information feature corresponding to the $i^{th}$ step.

In this embodiment, a specific manner of calculating the $t^{th}$ motion information feature $s_t$ corresponding to the $i^{th}$ step is introduced. The following manner may be used:

$$(h_t = \phi(W_h x_t + U_h [s_{t+1}^{i-1} \circ r_{t+1}, s_{t-1}^{i-1} \circ r_{t-1}]^T);$$

$$r_{t-1} = \sigma(W_r x_t + U_{r,t-1} s_{t-1}^{i-1});$$

$$r_{t+1} = \sigma(W_r x_t + U_{r,t+1} s_{t+1}^{i-1});$$

$$\tilde{z}_{t-1} = \sigma(W_z x_t + U_{z,t-1} s_{t-1}^{i-1});$$

$$\tilde{z}_{t+1} = \sigma(W_z x_t + U_{z,t+1} s_{t+1}^{i-1});$$

$$[z_{t+1}, z, z_{t-1}] = \text{soft max}([\tilde{z}_{t+1}, 1, \tilde{z}_{t-1}]);$$

$$s_t^i = z \circ h_t + z_{t-1} \circ s_{t-1}^{i-1} + z_{t+1} \circ s_{t+1}^{i-1};$$

where it is assumed that a dimension of $x_t$ is $D_x$, a dimension of $h_t$ is $D_h$, a dimension of $s_t$ is $D_s$, and a dimension of $r_t$ is $D_r$, where a dimension is unrelated to a time point t, $D_s = D_r$, then a dimension of the seventh parameter matrix $W_h$ is $D_h \times D_x$, and a dimension of the eighth parameter matrix $U_h$ is $D_h \times D_s$. A dimension of the fourth parameter matrix $W_z$ is $D_z \times D_x$ a dimension of the fifth parameter matrix $U_{z,t-1}$ and the sixth parameter matrix $U_{z,t+1}$ is $D_z \times D_s$ and a dimension of second parameter matrix $U_{r,t-1}$ and the third parameter matrix $U_{r,t+1}$ is $D^r \times D_s$.

In $s_t^i = z \circ h_t + z_{t-1} \circ s_{t-1}^{i-1} + z_{t+1} \circ s_{t+1}^{i-1}$, $\circ$ represents a dot multiplication symbol, that is, values in corresponding positions of vectors are multiplied with each other, for example, [1, 2, 3]∘[2, 3, 4]=[2, 6, 12]. Dot multiplication is respectively performed on $z_{t+1}$, $z$, $z_{t-1}$, and $s_{t-1}^{i-1}$, $h_t$, $s_{t+1}^{i-1}$, to control contribution degrees of the foregoing different vectors to the output $s_t^i$.

Further, in this embodiment of this application, specific manners of calculating feature vectors are provided, including: a manner of calculating the $(t+1)^{th}$ update gate vector and the $(t-1)^{th}$ update gate vector corresponding to the $i^{th}$ step, a manner of calculating the $(t+1)^{th}$ output gate vector and the $(t-1)^{th}$ output gate vector corresponding to the $i^{th}$ step, a manner of calculating the $t^{th}$ hidden state feature vector corresponding to the $i^{th}$ step, and a manner of calculating the $t^{th}$ motion information feature corresponding to the $i^{th}$ step. In the foregoing manner, the problem that motion information features at a previous time point and at a later time point cannot be simultaneously received during calculation of a motion information feature can be resolved by using a recursive calculation pattern. Therefore, feasibility and operability of the solution can be ensured by performing motion information feature estimation in a recursive manner.

In some embodiments, based on FIG. 3 and the first to fifth embodiments corresponding to FIG. 3, in a sixth optional embodiment of the video classification method provided in the embodiments of this application, the determining a video classification result of the to-be-classified video file according to the appearance information feature sequence and the motion information feature sequence may include:

obtaining a video class vector corresponding to the appearance information feature sequence and the motion information feature sequence, the video class vector including C video class elements, C being an integer greater than 1;

determining at least one target video class element from the video class vector; and generating the video classification result of the to-be-classified video file according to the at least one target video class element.

In a possible embodiment, an obtaining process of the video class vector may be implemented by using a video classification model. Whether the obtaining process is performed by using a video classification model is not specifically limited in this embodiment of this application.

In this embodiment, a manner of determining the video classification result is introduced. First, the video classification apparatus needs to obtain the video class vector corresponding to the appearance information feature sequence and the motion information feature sequence by using the video classification model. The video class vector herein includes C video class elements, and each video class element represents one video class, such as "entertainment", "sports", "news", "life", or "technology". Then at least one target video class element is determined from the video class vector. Generally, an element with a relatively large value is selected as a target video class element. Finally, the video classification apparatus generates the video classification result of the to-be-classified video file according to the at least one target video class element.

Specifically, a description is provided below with reference to an example. After the appearance information feature sequence $\{x_{video}^t\}_{t=1}^T$ is obtained and the motion information feature sequence $\{s_{motion}^t\}_{t=1}^T$ is predicted, the to-be-classified video file is classified by using a video classification model. The video classification model includes, but not limited to, a support vector machine (SVM) classifier, a k-nearest neighbor (KNN) classifier, a neural network classifier, a multi-layer non-linear network classification model, and a multi-layer non-linear network hybrid expert classification model.

A C-dimensional video class vector represented by using probabilities is outputted by using the video classification model, C being an integer greater than 1, and C being a preset quantity of video class elements. A value in a position of each element in the video class vector represents a probability that the to-be-classified video file belongs to a corresponding class, and finally the video class vector is converted into a class, to obtain the video classification result. Three types of video class elements (which are respectively "entertainment", "sports", and "life") is used as an example. It is assumed that the video class vector is represented as [0.1, 0.9, 0.7], which indicates that the video classification model determines that a probability that the to-be-classified video file belongs to "entertainment" is 0.1, a probability that the to-be-classified video file belongs to "sports" is 0.9, and a probability that the to-be-classified video file belongs to "life" is 0.7. It can be learned that the probabilities that the to-be-classified video file belongs to the class "sports" and the class "life" are relatively high. That is, it is determined that target video class elements are "sports" and "life". In this case, a video classification result of the to-be-classified video file is generated: "sports+life". If only one target video class element is outputted, "sports" may be outputted. That is, a video classification result of the to-be-classified video file is generated: "sports".

Each class may appear independently, so that a sum of values of a video class vector is not required to be 1. However, a case of classification of a single class, that is, a case that a sum of values of a video class vector is 1 is not excluded.

Still further, in this embodiment of this application, a method for determining the video classification result of the to-be-classified video file is provided. That is, the video classification apparatus first obtains the video class vector corresponding to the appearance information feature sequence and the motion information feature sequence by using a video classification model, then determines at least one target video class element from the video class vector, and finally generates the video classification result of the to-be-classified video file according to the at least one target video class element. In the foregoing manner, a probability that the video file belongs to a class can be determined according to a video class vector outputted by the video classification model, and in this way, reliability and accuracy of video file classification are ensured. For some video files that may not only belong to one class, a plurality of classes may be allocated to the video files for video class vectors outputted by the video classification model in this solution, thereby improving diversity of the solution.

Figure 7:
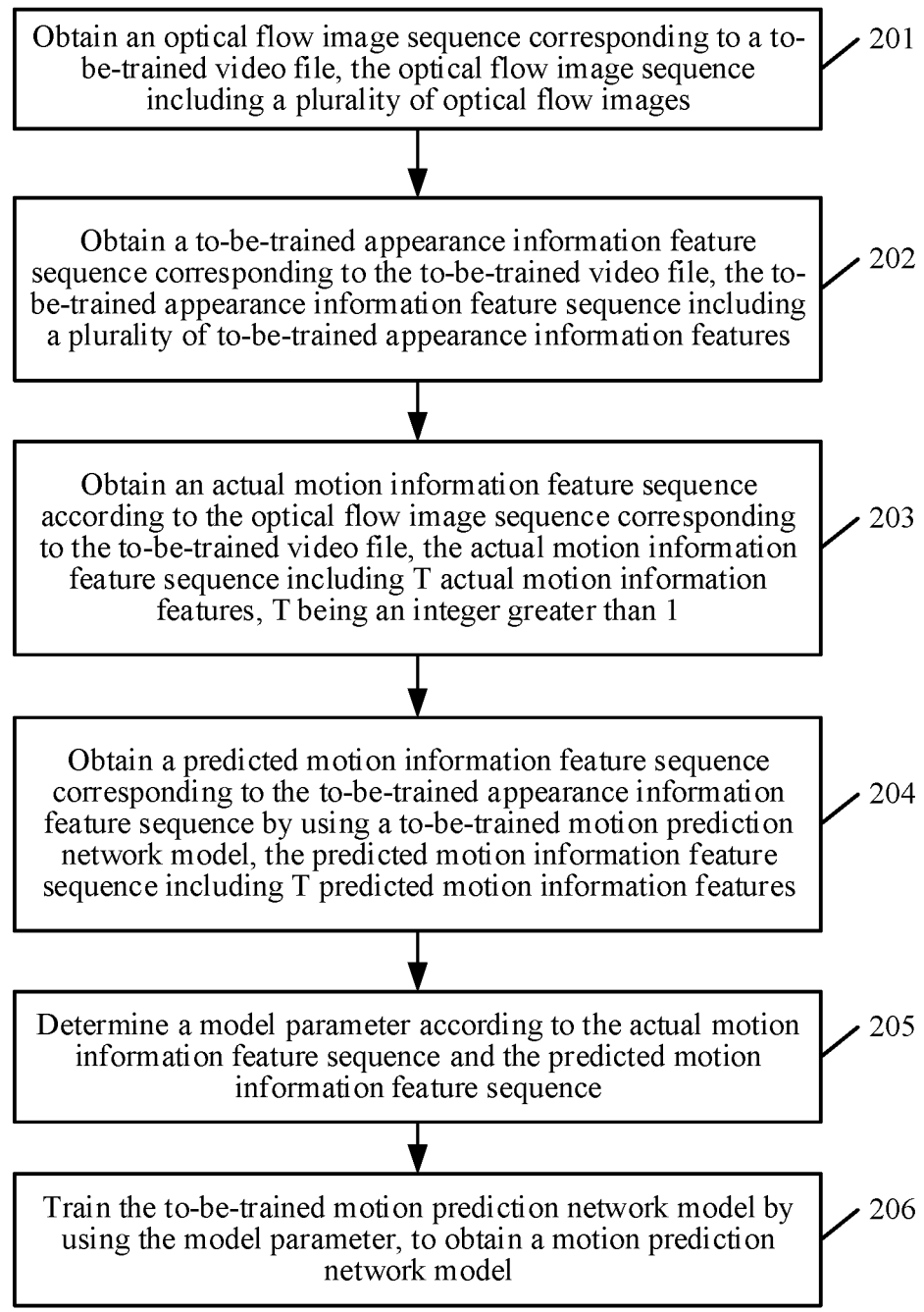
FIG. 7 is a schematic diagram of an embodiment of a model training method according to an embodiment of this application.

The model training method in this application is introduced below with reference to the foregoing introduction. Referring to FIG. 7, an embodiment of the model training method in the embodiments of this application includes the following steps:

201: Obtain an optical flow image sequence corresponding to a to-be-trained video file, the optical flow image sequence including a plurality of optical flow images.

In this embodiment, for training of a motion prediction network model, a model training apparatus may first perform calculation for optical flow images of the to-be-trained video file by using a total variational L1 norm (TVL1) optical flow estimation method, where an effect of the optical flow images obtained by using the TVL1 method is relatively good. Therefore, an optical flow image sequence is obtained, the optical flow image sequence including a plurality of optical flow images.

It is to be understood that, in an actual application, another optical flow calculation method, for example, a Brox method, may alternatively be used. The optical flow method is actually a method in which a moving speed and a moving direction of an object are deduced by detecting changes of intensities of pixel points in an image over time. The optical flow image is image display of values calculated by using the optical flow method. The optical flow image is generally divided into two single-channel grayscale images, which respectively represent motion intensities of pixel points in a vertical direction and in a horizontal direction. The intensity is represented in a form of image brightness.

Because the process is a model training process, extraction of the optical flow images and calculation of optical flow features can be performed by using the optical flow estimation method. Generally, the model training apparatus may be deployed in a computer machine or cluster with relatively high performance and a relatively larger quantity of storage resources.

202: Obtain a to-be-trained appearance information feature sequence corresponding to the to-be-trained video file, the to-be-trained appearance information feature sequence including a plurality of to-be-trained appearance information features.

In this embodiment, the model training apparatus may extract a to-be-trained appearance information feature sequence corresponding to the to-be-trained video file by using a neural network, the to-be-trained appearance information feature sequence including a plurality of to-be-trained appearance information features. The to-be-trained appearance information feature sequence may be recorded as $\{x_{video}^t\}_{t=1}^T$.

203: Obtain an actual motion information feature sequence according to the optical flow image sequence corresponding to the to-be-trained video file, the actual motion information feature sequence including T actual motion information features, T being an integer greater than 1.

In this embodiment, the model training apparatus extracts actual motion information features according to the optical flow image sequence corresponding to the to-be-trained video file by using a convolutional neural network, T actual motion information feature forming an actual motion information feature sequence, and T being an integer greater than 1. The actual motion information feature sequence may be recorded as $\{\tilde{S}_{motion}^t\}_{t=1}^T$.

A quantity of floating-point operations of 110 gigabytes (G) per second is required for calculating the appearance information features and the actual motion information features, and only a quantity of floating-point operations of 55 G per second is required for calculating the appearance information features and the motion information features by using the motion prediction network model. The quantity of floating-point operations is a quantity of operations for a quantity of floating-points performed by a machine, which reflects consumption of computing resources. The storage resources are mainly storage of optical flow images. Because the optical flow image is two single-channel images, a size of the optical flow image is approximately ⅔ of that of an RGB image. By using a video of 1 GB as an example, JPG images obtained through decompression are about 10 GB, so that optical flow images occupy about a 6.6 GB space.

204: Obtain a predicted motion information feature sequence corresponding to the to-be-trained appearance information feature sequence by using a to-be-trained motion prediction network model, the predicted motion information feature sequence including T predicted motion information features.

In this embodiment, the model training apparatus inputs the to-be-trained appearance information feature sequence $\{x_{video}^{\prime t}\}_{t=1}^{T}$ into a to-be-trained motion prediction network model, and the to-be-trained motion prediction network model outputs a corresponding predicted motion information feature sequence. The predicted motion information feature sequence may be recoded as $\{S_{motion}^{\prime t}\}_{t=1}^{T}$. That is, the predicted motion information feature sequence $\{S_{motion}^{\prime t}\}_{t=1}^{T}$ includes T predicted motion information features.

205: Determine a model parameter according to the actual motion information feature sequence and the predicted motion information feature sequence.

In this embodiment, the model training apparatus updates a model parameter in the to-be-trained motion prediction network model by using a gradient descent algorithm, and performs calculation according to the actual motion information feature sequence and the predicted motion information feature sequence by using a loss function, to obtain the model parameter.

206: Train the to-be-trained motion prediction network model by using the model parameter, to obtain a motion prediction network model.

In this embodiment, the model training apparatus trains the to-be-trained motion prediction network model by using the model parameter, to obtain a motion prediction network model. Therefore, the motion prediction network model can predict a motion information feature sequence $\{S_{motion}^{\prime t}\}_{t=1}^{T}$ close to the actual motion information feature sequence $\{\tilde{S}_{motion}^{\prime t}\}_{t=1}^{T}$ according to the inputted appearance information feature sequence $\{x_{video}^{\prime t}\}_{t=1}^{T}$. It is unnecessary to calculate optical flow images, and it is unnecessary to extract actual motion information features from the optical flow images by using a convolutional neural network, thereby greatly reducing a calculation amount and storage resources.

In this embodiment of this application, a model training method is provided. The model training apparatus first obtains an optical flow image sequence corresponding to a to-be-trained video file; then obtains a to-be-trained appearance information feature sequence corresponding to the to-be-trained video file, the to-be-trained appearance information feature sequence including a plurality of to-be-trained appearance information features; obtains an actual motion information feature sequence according to the optical flow image sequence corresponding to the to-be-trained video file; subsequently obtains a predicted motion information feature sequence corresponding to the to-be-trained appearance information feature sequence by using a to-be-trained motion prediction network model, the predicted motion information feature sequence including T predicted motion information features; determines a model parameter according to the actual motion information feature sequence and the predicted motion information feature sequence; and finally may train the to-be-trained motion prediction network model by using the model parameter, to obtain a motion prediction network model. In the foregoing manner, optical flow images of the video file are used as trained objects during model training, so that the motion prediction network model obtained through training has a function of implicitly obtaining the optical flow images in the video file. In an actual application, the motion information features can be directly outputted by using the motion prediction network model without calculating the optical flow images for a special purpose, thereby greatly reducing a calculation amount and storage resources.

In some embodiments, based on the embodiment corresponding to FIG. 7, in a first optional embodiment of the model training method provided in the embodiments of this application, the determining a model parameter according to the actual motion information feature sequence and the predicted motion information feature sequence may include:

performing calculation according to the actual motion information feature sequence and the predicted motion information feature sequence by using a loss function, to obtain a target loss result; and determining the model parameter according to the target loss result.

In this embodiment, a method for determining the model parameter according to the actual motion information feature sequence and the predicted motion information feature sequence is introduced. That is, calculation is performed according to an actual value and a predicted value by using the loss function, to obtain a target loss result. The target loss result represents a distance between the actual value and the predicted value. Therefore, the loss function is a non-negative real-valued function. A smaller target loss result indicates better robustness of the to-be-trained motion prediction network model. It is to be understood that a type of a used loss function is not limited in this application. Several loss functions that may be used in this embodiment are introduced below.

A first type is a mean-square error (MSE) loss function. The MSE loss function represents a sum of squares of differences between the actual motion information features and the predicted motion information features. An increasing error between the actual motion information feature and the predicted motion information feature causes a more rapid increase of an MSE loss result.

A second type is a mean absolute error (MAE) loss function. The MAE loss function represents a sum of absolute values of differences between the actual motion information features and the predicted motion information features, that is, represents an average error magnitude between the actual motion information features and the predicted motion information features, where directions of errors do not need to be considered, and a range is 0 to positive infinity.

A third type is a Huber loss function. Compared with a square loss, the Huber loss function is not sensitive to an abnormal value, and also maintains a property of being differentiable. The Huber loss function is based on an absolute error, and when the error is very small, the Huber loss function is based on a square error. A threshold of the error may be adjusted by using a hyper-parameter. When the hyper-parameter is close to 0, the Huber loss function degenerates into an MAE loss function; and when the hyper-parameter is close to positive infinity, the Huber loss function degenerates into an MSE loss function.

A fourth type is a Log-Cosh loss function. The Log-Cosh loss function is relatively smooth, and a predicted error may be calculated by using a hyperbolic cosine.

A fifth type is a quantile loss function. In most predicted problems in the actual world, uncertainty of prediction results is usually expected to be seen. To predict a value range instead of specific value points is crucial for decision-making in a specific service process.

In addition, in this embodiment of this application, a method for determining the model parameter according to the actual motion information feature sequence and the predicted motion information feature sequence is provided.

That is, the model training apparatus first performs calculation according to the actual motion information feature sequence and the predicted motion information feature sequence by using a loss function, to obtain a target loss result, and then determines the model parameter according to the target loss result. In the foregoing manner, a loss result can be calculated by using a suitable loss function, and the model parameter is calculated based on a minimum value of the loss result. The model parameter can effectively train and obtain a machine learning model, thereby improving reliability and accuracy of model training.

In some embodiments, based on the first embodiment corresponding to FIG. 7, in a second optional embodiment of the model training method provided in the embodiments of this application, the performing calculation according to the actual motion information feature sequence and the predicted motion information feature sequence by using a loss function, to obtain a target loss result may include:

calculating the target loss result in the following manner:

$$L_{MSE} = \frac{1}{T}\sum_{t}^{T}\|\tilde{S}^t - S^t\|_2^2;$$

where $L_{MSE}$ represents the target loss result, T represents a quantity of actual motion information features in the actual motion information feature sequence, $\tilde{S}^t$ represents a $t^{th}$ actual motion information feature in the actual motion information feature sequence, and $S^t$ represents a $t^{th}$ predicted motion information feature in the predicted motion information feature sequence, t being an integer greater than or equal to 1 and less than or equal to T.

In this embodiment, a specific manner of calculating the target loss result by using an MSE loss function is introduced. After the model training apparatus obtains the actual motion information feature sequence and the predicted motion information feature sequence, the MSE loss function may be used as a loss function used in this embodiment. It is assumed that a desirable motion prediction network model is a function, then a distance between the actual motion information feature and the predicted motion information feature may be approximately represented by using the MSE loss function. An infinitely small distance indicates that a model is closer to the desirable model.

Specifically, the target loss result may be calculated in the following manner:

$$L_{MSE} = \frac{1}{T}\sum_{t}^{T}\|\tilde{S}^t - S^t\|_2^2;$$

where in the formula, $\tilde{S}^t$ represents a $t^{th}$ actual motion information feature in a processed batch of the actual motion information feature sequence; $S^t$ represents a $t^{th}$ predicted motion information feature in the predicted motion information feature sequence, that is, a prediction result outputted by the to-be-trained motion prediction network model; and the MSE loss function is a function for calculating an average error of a batch.

In addition, in this embodiment of this application, a specific manner of calculating the target loss result is provided. That is, calculation is performed according to the actual motion information feature sequence and the predicted motion information feature sequence by using an MSE loss function, to obtain a target loss result. In the foregoing manner, complexity of the calculation can be reduced by performing calculation by using the MSE loss function, and even if a fixed learning rate is used, effective convergence can be implemented. A gradient of the MSE loss function increases as a loss increases, and decreases when the loss is close to 0, so that a result obtained by using the MSE loss function is more accurate when the training is completed.

It is to be understood that a linear classification network is used for a test in this application, and a relatively good effect is achieved. In a large-scale video dataset, video features are classified according to appearance information features extracted by using an Inception-V4 method, with reference to motion information features, and by using a linear classifier method, to obtain classification performance with 0.23% global average precision (GAP) @20 and first class hit performance with precision about 0.2% higher than that of a result obtained by merely using the appearance information features.

GAP@20 is a multi-class video classification performance indicator, and first class hit is a statistical result of a case that a class with highest classification confidence hits an actual video class, and a class corresponding to a result having a highest score is the actual video class.

Therefore, by predicting video motion information features by using the motion prediction network model proposed in this application, the video classification model can effectively perform high-performance classification on an input video, to obtain a more accurate class output. Therefore, the video classification model can be widely deployed in various video application services, such as a video recommendation service and a video filtering service.

Figure 8:
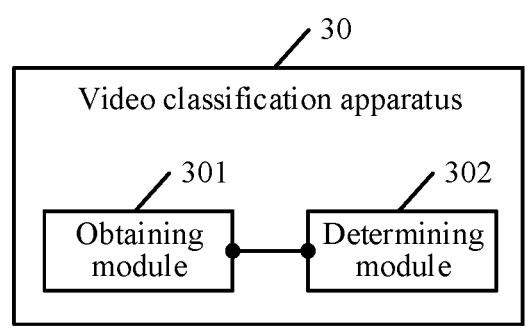
FIG. 8 is a schematic diagram of an embodiment of a video classification apparatus according to an embodiment of this application.

A video classification apparatus in this application is described below in detail. FIG. 8 is a schematic diagram of an embodiment of the video classification apparatus according to the embodiments of this application. The video classification apparatus 30 includes:

an obtaining module 301, configured to obtain an image frame sequence corresponding to a to-be-classified video file, the image frame sequence including T image frames, T being an integer greater than 1;

the obtaining module 301 being further configured to obtain an appearance information feature sequence corresponding to the image frame sequence, the appearance information feature sequence including T appearance information features, each appearance information feature having a correspondence with one of the T image frames;

the obtaining module 301 being further configured to obtain a motion information feature sequence corresponding to the appearance information feature sequence, the motion information feature sequence including T motion information features, each motion information feature having a correspondence with one of the T appearance information feature; and a determining module 302 configured to determine a video classification result of the to-be-classified video file according to the appearance information feature sequence and the motion information feature sequence obtained by the obtaining module 301.

In this embodiment, the obtaining module 301 obtains an image frame sequence corresponding to a to-be-classified video file, the image frame sequence including T image frames, T being an integer greater than 1; the obtaining module 301 obtains an appearance information feature sequence corresponding to the image frame sequence, the appearance information feature sequence including T appearance information features, each appearance information feature having a correspondence with one of the T image frames; the obtaining module 301 obtains a motion information feature sequence corresponding to the appearance information feature sequence, the motion information feature sequence including T motion information features, each motion information feature having a correspondence with one of the T appearance information feature; and the determining module 302 determines a video classification result of the to-be-classified video file according to the appearance information feature sequence and the motion information feature sequence obtained by the obtaining module 301.

In some embodiments, based on the embodiment corresponding to FIG. 8, in another embodiment of the video classification apparatus 30 provided in this embodiment of this application, the obtaining module 301 is specifically configured to obtain the appearance information feature sequence corresponding to the image frame sequence by using an image classification network model; and the obtaining module 301 is specifically configured to obtain the motion information feature sequence corresponding to the appearance information feature sequence by using a motion prediction network model, the motion prediction network model being configured to predict the motion information features corresponding to the appearance information features.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In this embodiment of this application, a video classification apparatus is provided. The video classification apparatus first obtains an image frame sequence corresponding to a to-be-classified video file, the image frame sequence including T image frames, T being an integer greater than 1; then obtains an appearance information feature sequence corresponding to the image frame sequence by using an image classification network model, the appearance information feature sequence including T appearance information features, each appearance information feature having a correspondence with one of the T image frames; subsequently obtains a motion information feature sequence corresponding to the appearance information feature sequence by using a motion prediction network model, the motion information feature sequence including T motion information features, each motion information feature having a correspondence with one of the T appearance information feature, and the motion prediction network model being configured to predict the motion information features corresponding to the appearance information features; and finally may determine a video classification result of the to-be-classified video file according to the appearance information feature sequence and the motion information feature sequence. In the foregoing manner, automatic classification of a video can be implemented, without a need to calculate optical flow images according to appearance information features of the video to calculate motion information features by using the optical flow images. Instead, the motion information features corresponding to the appearance information features can be directly obtained by using a motion prediction network model, so as to save computing time and resources, thereby improving data processing efficiency.

In some embodiments, based on the embodiment corresponding to FIG. 8, in another embodiment of the video classification apparatus 30 provided in this embodiment of this application, the obtaining module 301 is specifically configured to:

obtain the to-be-classified video file; and decode the to-be-classified video file, to obtain the image frame sequence, a sampling frequency for each image frame being the same.

In addition, in this embodiment of this application, a manner in which the video classification apparatus obtains the image frame sequence corresponding to the to-be-classified video file is introduced. That is, the to-be-classified video file is first obtained, then the to-be-classified video file is decoded, to obtain the image frame sequence, a sampling frequency for each image frame being the same. In the foregoing manner, the video file can be decoded according to a set sampling frequency, to obtain the corresponding image frame sequence, so as to facilitate subsequent processing, thereby improving feasibility and operability of the solution.

In some embodiments, based on the embodiment corresponding to FIG. 8, in another embodiment of the video classification apparatus 30 provided in this embodiment of this application, the obtaining module 301 is specifically configured to:

obtain an appearance information feature corresponding to a $t^{th}$ image frame by using the image classification network model, t being an integer greater than or equal to 1 and less than or equal to T; and generate the appearance information feature sequence according to the T appearance information features when an appearance information feature corresponding to each of the T image frames has been obtained.

In addition, in this embodiment of this application, a method for obtaining the appearance information feature sequence by using the image classification network model is provided. That is, the video classification apparatus first obtains the appearance information feature corresponding to the $t^{th}$ image frame by using the image classification network model, and when an appearance information feature corresponding to each of the T image frames has been obtained, the video classification apparatus generates the appearance information feature sequence according to the T appearance information features. In the foregoing manner, the appearance information feature sequence of the video file can be directly outputted by using the image classification network model, without a need to manually extract the feature sequence. Therefore, on one hand, feature prediction accuracy can be improved; on the other hand, labor costs are saved, and feature extraction efficiency can further be improved.

In some embodiments, based on the embodiment corresponding to FIG. 8, in another embodiment of the video classification apparatus 30 provided in this embodiment of this application, the obtaining module 301 is specifically configured to:

obtain a $t^{th}$ appearance information feature corresponding to an $i^{th}$ step, i being an integer greater than or equal to 1, and t being an integer greater than or equal to 1 and less than or equal to T;

obtain a $(t+1)^{th}$ motion information feature and a $(t-1)^{th}$ motion information feature corresponding to an $(i-1)^{th}$ step;

determine a $t^{th}$ motion information feature corresponding to the $i^{th}$ step according to the $t^{th}$ appearance information feature, the $(t+1)^{th}$ motion information feature, and the $(t-1)^{th}$ motion information feature by using the motion prediction network model; and generate the motion information feature sequence according to the T motion information features when a motion information feature corresponding to each of the T appearance information features has been obtained.

In addition, in this embodiment of this application, a method for obtaining the motion information feature sequence corresponding to the appearance information feature sequence by using the motion prediction network model is provided. That is, the video classification apparatus first obtains the $t^{th}$ appearance information feature corresponding to the $i^{th}$ step, then obtains the $(t+1)^{th}$ motion information feature and the $(t-1)^{th}$ motion information feature corresponding to the $(i-1)^{th}$ step, subsequently determines the $t^{th}$ motion information feature corresponding to the $i^{th}$ step according to the $t^{th}$ appearance information feature, the $(t+1)^{th}$ motion information feature, and the $(t-1)^{th}$ motion information feature by using the motion prediction network model, and generates the motion information feature sequence according to the T motion information features when a motion information feature corresponding to each of the T appearance information features has been obtained. In the foregoing manner, the motion information feature sequence can be directly obtained by using the motion prediction network model, to automatically classify the video file, so as to complete recognition on video contents, thereby greatly reducing workloads of screening personnel for video contents. In addition, for applications of the video recommendation aspect, user personalized recommendation can be performed according to video classes, thereby improving user experience and enriching product contents.

In some embodiments, based on the embodiment corresponding to FIG. 8, in another embodiment of the video classification apparatus 30 provided in this embodiment of this application, the obtaining module 301 is specifically configured to:

calculate a $(t+1)^{th}$ update gate vector and a $(t-1)^{th}$ update gate vector corresponding to the $i^{th}$ step according to the $t^{th}$ appearance information feature, the $(t+1)^{th}$ motion information feature, and the $(t-1)^{th}$ motion information feature by using an update gate of the motion prediction network model;

calculate a $(t+1)^{th}$ output gate vector and a $(t-1)^{th}$ output gate vector corresponding to the $i^{th}$ step according to the $t^{th}$ appearance information feature, the $(t+1)^{th}$ motion information feature, and the $(t-1)^{th}$ motion information feature by using an output gate of the motion prediction network model;

calculate a $t^{th}$ hidden state feature vector corresponding to the $i^{th}$ step according to the $t^{th}$ appearance information feature, the $(t+1)^{th}$ motion information feature, the $(t-1)^{th}$ motion information feature, the $(t+1)^{th}$ update gate vector, and the $(t-1)^{th}$ update gate vector by using a hidden state of the motion prediction network model; and calculate the $t^{th}$ motion information feature corresponding to the $i^{th}$ step according to the $t^{th}$ hidden state feature vector and the $(t+1)^{th}$ output gate vector and the $(t-1)^{th}$ output gate vector corresponding to the $i^{th}$ step by using a final output layer of the motion prediction network model.

In addition, in this embodiment of this application, a method for determining the $t^{th}$ motion information feature corresponding to the $i^{th}$ step according to the $t^{th}$ appearance information feature, the $(t+1)^{th}$ motion information feature, and the $(t-1)^{th}$ motion information feature is provided. In the foregoing manner, the design for the motion prediction network model is mainly divided into four parts, which are respectively a hidden state, an update gate, an output gate, and a final output layer. In this way, calculation may be separately performed for the parts, to calculate the motion information features, thereby ensuring feasibility and operability of the solution.

In some embodiments, based on the embodiment corresponding to FIG. 8, in another embodiment of the video classification apparatus 30 provided in this embodiment of this application, the obtaining module 301 is specifically configured to:

calculate the $(t+1)^{th}$ update gate vector and the $(t-1)^{th}$ update gate vector in the following manner:

$$r_{t-1} = \sigma(W_r x_t + U_{r,t-1} s_{t-1}^{i-1});$$

$$r_{t+1} = \sigma(W_r x_t + U_{r,t+1} s_{t+1}^{i-1});$$

where $r_{t-1}$ represents the $(t-1)^{th}$ update gate vector corresponding to the $i^{th}$ step, t represents a $t^{th}$ time point, represents the $(t+1)^{th}$ update gate vector corresponding to the $i^{th}$ step, $\sigma(\ )$ represents a rectified linear unit, $W_r$ represents a first parameter matrix, $U_{r,t-1}$ represents a second parameter matrix corresponding to the $(t-1)^{th}$ update gate vector, $U_{r,t+1}$ represents a third parameter matrix corresponding to the $(t+1)^{th}$ update gate vector, $x_t$ represents the $t^{th}$ appearance information feature, $s_{t-1}^{i-1}$ represents the $(t-1)^{th}$ motion information feature corresponding to the $(i-1)^{th}$ step, and represents the $(t+1)^{th}$ motion information feature corresponding to the $(i-1)^{th}$ step;

calculate the $(t+1)^{th}$ output gate vector and the $(t-1)^{th}$ output gate vector in the following manner:

$$[z_{t+1}, z, z_{t-1}] = \text{soft max}([\tilde{z}_{t+1}, 1, \tilde{z}_{t-1}]);$$

$$\tilde{z}_{t-1} = \sigma(W_z x_t + U_{z,t-1} s_{t-1}^{i-1});$$

$$\tilde{z}_{t+1} = \sigma(W_z x_t + U_{z,t+1} s_{t+1}^{i-1});$$

where $z_{t+1}$ represents the $(t+1)^{th}$ output gate vector corresponding to the $i^{th}$ step, $z_{t-1}$ represents the $(t-1)^{th}$ output gate vector corresponding to the $i^{th}$ step, z represents a preset output gate vector, $\tilde{z}_{t-1}$ represents a $(t-1)^{th}$ to-be-processed output gate vector corresponding to the $i^{th}$ step, $\tilde{z}_{t+1}$ represents a $(t+1)^{th}$ to-be-processed output gate vector corresponding to the $i^{th}$ step, soft max ( ) represents a normalization function, represents a fourth parameter matrix, $U_{z,t-1}$ represents a fifth parameter matrix corresponding to the $(t-1)^{th}$ output gate vector, and $U_{z,t+1}$ represents a sixth parameter matrix corresponding to the $(t+1)^{th}$ output gate vector;

calculate the $t^{th}$ hidden state feature vector in the following manner:

$$h_t = \phi(W_h x_t + U_h [s_{t+1}^{i-1} \circ r_{t+1}, s_{t-1}^{i-1} \circ r_{t-1}]^T);$$

where $h_t$ represents the $t^{th}$ hidden state feature vector corresponding to the $i^{th}$ step, $\phi(\ )$ represents a sigmoid function, $W_h$ represents a seventh parameter matrix, $U_h$ represents an eighth parameter matrix, $[\ ]^T$ represents a matrix transpose, and $\circ$ represents dot multiplication; and calculate the $t^{th}$ motion information feature in the following manner:

$$s_t^i = z \circ h_t + z_{t-1} \circ s_{t-1}^{i-1} + z_{t+1} \circ s_{t+1}^{i-1};$$

where $s_t^i$ represents the $t^{th}$ motion information feature corresponding to the $i^{th}$ step.

Further, in this embodiment of this application, specific manners of calculating feature vectors are provided, including: a manner of calculating the $(t+1)^{th}$ update gate vector and the $(t-1)^{th}$ update gate vector corresponding to the $i^{th}$ step, a manner of calculating the $(t+1)^{th}$ output gate vector and the $(t-1)^{th}$ output gate vector corresponding to the $i^{th}$ step, a manner of calculating the $t^{th}$ hidden state feature vector corresponding to the $i^{th}$ step, and a manner of calculating the $t^{th}$ motion information feature corresponding to the $i^{th}$ step. In the foregoing manner, the problem that motion information features at a previous time point and at a later time point cannot be simultaneously received during calculation of a motion information feature can be resolved by using a recursive calculation pattern. Therefore, feasibility and operability of the solution can be ensured by performing motion information feature estimation in a recursive manner.

In some embodiments, based on the embodiment corresponding to FIG. 8, in another embodiment of the video classification apparatus 30 provided in this embodiment of this application, the determining module 302 is specifically configured to: obtain a video class vector corresponding to the appearance information feature sequence and the motion information feature sequence, the video class vector including C video class elements, C being an integer greater than 1;

determine at least one target video class element from the video class vector; and generate the video classification result of the to-be-classified video file according to the at least one target video class element.

Still further, in this embodiment of this application, a method for determining the video classification result of the to-be-classified video file is provided. That is, the video classification apparatus first obtains the video class vector corresponding to the appearance information feature sequence and the motion information feature sequence by using a video classification model, then determines at least one target video class element from the video class vector, and finally generates the video classification result of the to-be-classified video file according to the at least one target video class element. In the foregoing manner, a probability that the video file belongs to a class can be determined according to a video class vector outputted by the video classification model, and in this way, reliability and accuracy of video file classification are ensured. For some video files that may not only belong to one class, a plurality of classes may be allocated to the video files for video class vectors outputted by the video classification model in this solution, thereby improving diversity of the solution.

Figure 9:
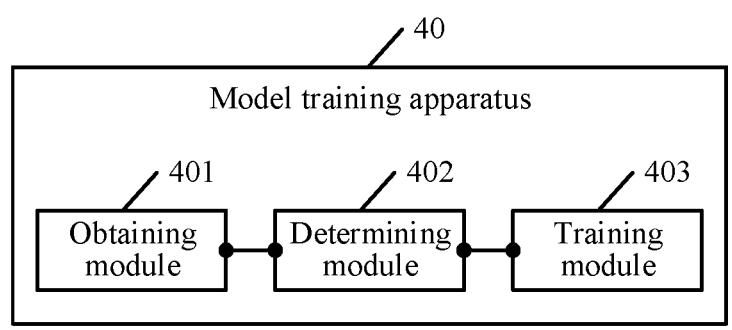
FIG. 9 is a schematic diagram of an embodiment of a model training apparatus according to an embodiment of this application.

A model training apparatus in this application is described below in detail. FIG. 9 is a schematic diagram of an embodiment of a model training apparatus according to an embodiment of this application. A model training apparatus 40 includes:

an obtaining module 401, configured to obtain an optical flow image sequence corresponding to a to-be-trained video file, the optical flow image sequence including a plurality of optical flow images;

the obtaining module 401 being further configured to obtain a to-be-trained appearance information feature sequence corresponding to the to-be-trained video file, the to-be-trained appearance information feature sequence including a plurality of to-be-trained appearance information features;

the obtaining module 401 being further configured to obtain an actual motion information feature sequence according to the optical flow image sequence corresponding to the to-be-trained video file, the actual motion information feature sequence including T actual motion information features, T being an integer greater than 1;

the obtaining module 401 being further configured to obtain a predicted motion information feature sequence corresponding to the to-be-trained appearance information feature sequence by using a to-be-trained motion prediction network model, the predicted motion information feature sequence including T predicted motion information features;

a determining module 402, configured to determine a model parameter according to the actual motion information feature sequence obtained by the obtaining module 401 and the predicted motion information feature sequence obtained by the obtaining module; and a training module 403, configured to train the to-be-trained motion prediction network model by using the model parameter determined by the determining module 402, to obtain a motion prediction network model.

In this embodiment, the obtaining module 401 obtains an optical flow image sequence corresponding to a to-be-trained video file, the optical flow image sequence including a plurality of optical flow images; the obtaining module 401 obtains a to-be-trained appearance information feature sequence corresponding to the to-be-trained video file, the to-be-trained appearance information feature sequence including a plurality of to-be-trained appearance information features; the obtaining module 401 obtains an actual motion information feature sequence according to the optical flow image sequence corresponding to the to-be-trained video file, the actual motion information feature sequence including T actual motion information features, T being an integer greater than 1; the obtaining module 401 obtains a predicted motion information feature sequence corresponding to the to-be-trained appearance information feature sequence by using a to-be-trained motion prediction network model, the predicted motion information feature sequence including T predicted motion information features; the determining module 402 determines a model parameter according to the actual motion information feature sequence obtained by the obtaining module 401 and the predicted motion information feature sequence obtained by the obtaining module; and the training module 403 trains the to-be-trained motion prediction network model by using the model parameter determined by the determining module 402, to obtain a motion prediction network model.

In this embodiment of this application, a model training apparatus is provided. The model training apparatus first obtains an optical flow image sequence corresponding to a to-be-trained video file; then obtains a to-be-trained appearance information feature sequence corresponding to the to-be-trained video file, the to-be-trained appearance information feature sequence including a plurality of to-betrained appearance information features; obtains an actual motion information feature sequence according to the optical flow image sequence corresponding to the to-be-trained video file; subsequently obtains a predicted motion information feature sequence corresponding to the to-be-trained appearance information feature sequence by using a to-be-trained motion prediction network model, the predicted motion information feature sequence including T predicted motion information features; determines a model parameter according to the actual motion information feature sequence and the predicted motion information feature sequence; and finally may train the to-be-trained motion prediction network model by using the model parameter, to obtain a motion prediction network model. In the foregoing manner, optical flow images of the video file are used as trained objects during model training, so that the motion prediction network model obtained through training has a function of implicitly obtaining the optical flow images in the video file. In an actual application, the motion information features can be directly outputted by using the motion prediction network model without calculating the optical flow images for a special purpose, thereby greatly reducing a calculation amount and storage resources.

In some embodiments, based on the embodiment corresponding to FIG. 9, in another embodiment of the model training apparatus 40 provided in this embodiment of this application, the determining module 402 is specifically configured to:

perform calculation according to the actual motion information feature sequence and the predicted motion information feature sequence by using a loss function, to obtain a target loss result; and determine the model parameter according to the target loss result.

In addition, in this embodiment of this application, a method for determining the model parameter according to the actual motion information feature sequence and the predicted motion information feature sequence is provided. That is, the model training apparatus first performs calculation according to the actual motion information feature sequence and the predicted motion information feature sequence by using a loss function, to obtain a target loss result, and then determines the model parameter according to the target loss result. In the foregoing manner, a loss result can be calculated by using a suitable loss function, and the model parameter is calculated based on a minimum value of the loss result. The model parameter can effectively train and obtain a machine learning model, thereby improving reliability and accuracy of model training.

In some embodiments, based on the embodiment corresponding to FIG. 9, in another embodiment of the model training apparatus 40 provided in this embodiment of this application, the determining module 402 is specifically configured to calculate the target loss result in the following manner:

$$L_{MSE} = \frac{1}{T}\sum_{t}^{T}\|\hat{S}^t - S^t\|_2^2;$$

where $L_{MSE}$ represents the target loss result, T represents a quantity of actual motion information features in the actual motion information feature sequence, $\hat{S}^{th}$ represents a $t^{th}$ actual motion information feature in the actual motion information feature sequence, and $S^t$ represents a $t^{th}$ predicted motion information feature in the predicted motion information feature sequence, t being an integer greater than or equal to 1 and less than or equal to T.

In addition, in this embodiment of this application, a specific manner of calculating the target loss result is provided. That is, calculation is performed according to the actual motion information feature sequence and the predicted motion information feature sequence by using an MSE loss function, to obtain a target loss result. In the foregoing manner, complexity of the calculation can be reduced by performing calculation by using the MSE loss function, and even if a fixed learning rate is used, effective convergence can be implemented. A gradient of the MSE loss function increases as a loss increases, and decreases when the loss is close to 0, so that a result obtained by using the MSE loss function is more accurate when the training is completed.

Figure 10:
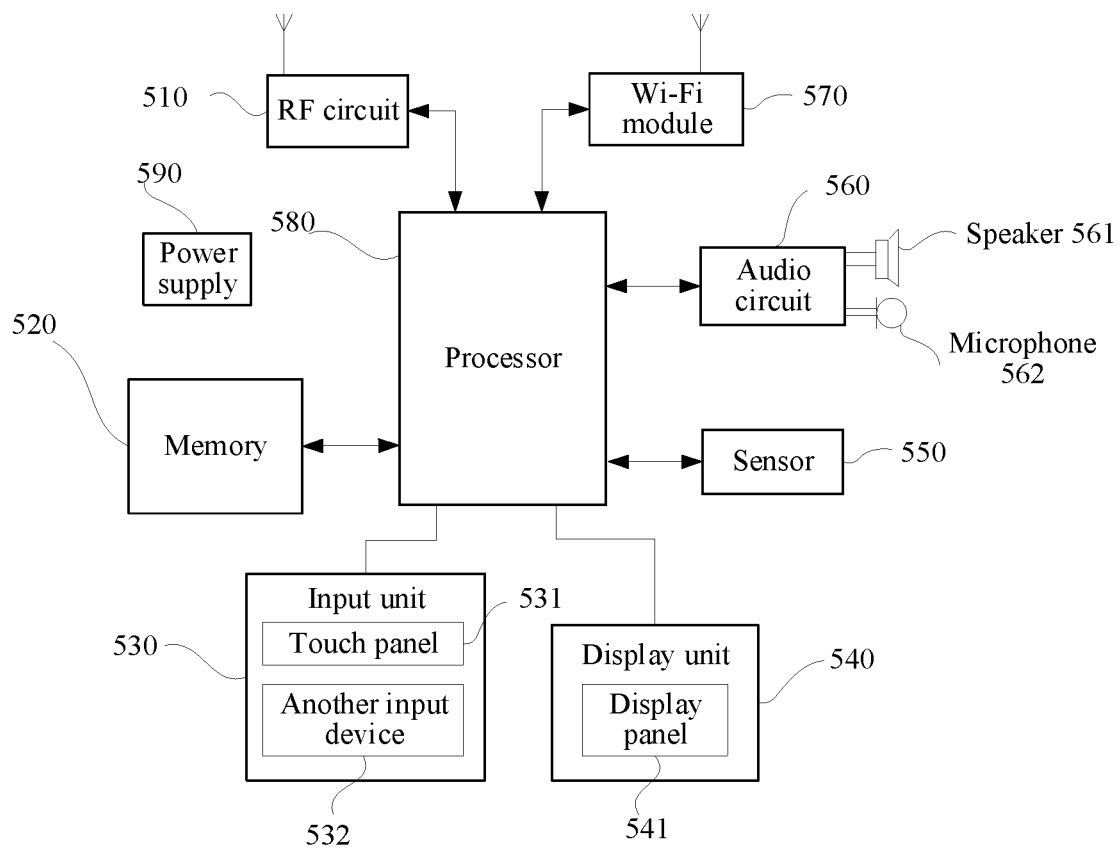
FIG. 10 is a schematic structural diagram of a terminal device according to an embodiment of this application.

The embodiments of this application further provide another video classification apparatus. As shown in FIG. 10, for ease of description, only parts related to the embodiments of this application are shown. For specific technical details that are not disclosed, refer to the method part in the embodiments of this application. The computer device may be provided as the terminal device shown in FIG. 10, or may be provided as the server shown in FIG. 11. The terminal device may be any terminal device including a mobile phone, a tablet computer, a personal digital assistant (PDA), a point of sales (POS), and an on-board computer, and the terminal device being a mobile phone is used as an example.

FIG. 10 shows a block diagram of the structure of a part of a mobile phone related to a terminal device according to an embodiment of this application. Referring to FIG. 10, the mobile phone includes components such as a radio frequency (RF) circuit 510, a memory 520, an input unit 530, a display unit 540, a sensor 550, an audio circuit 560, a wireless fidelity (Wi-Fi) module 570, a processor 580, and a power supply 590. Persons skilled in the art may understand that the structure of the mobile phone shown in FIG. 10 does not constitute a limitation on the mobile phone, and the mobile phone may include more components or fewer components than those shown in the figure, or some components may be combined, or a different component deployment may be used.

The following makes a specific description of components of the mobile phone with reference to FIG. 10.

The RF circuit 510 may be configured to send and receive signals during an information receiving and sending process or a call process. Specifically, the RF circuit receives downlink information from a base station, then delivers the downlink information to the processor 580 for processing, and sends designed uplink data to the base station. Usually, the RF circuit 510 includes, but is not limited to, an antenna, at least one amplifier, a transceiver, a coupler, a low noise amplifier (LNA), and a duplexer. In addition, the RF circuit 510 may also communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 520 may be configured to store a software program and module. The processor 580 runs the software program and module stored in the memory 520, to implement various functional applications and data processing of the mobile phone. The memory 520 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 520 may include a high-speed random access memory, and may also include a non-volatile memory, for example, at least one magnetic disk storage device, a flash memory, or another volatile solid-state storage device.

The input unit 530 may be configured to receive input digit or character information, and generate a keyboard signal input related to the user setting and function control of the mobile phone. Specifically, the input unit 530 may include a touch panel 531 and another input device 532. The touch panel 531, which may also be referred to as a touch screen, may collect a touch operation of a user on or near the touch panel (such as an operation of a user on the touch panel 531 or near the touch panel 531 by using any suitable object or accessory such as a finger or a stylus), and drive a corresponding connection apparatus according to a preset program. In some embodiments, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 580. Moreover, the touch controller can receive and execute a command transmitted from the processor 580. In addition, the touch panel 531 may be implemented by using various types, such as a resistive type, a capacitive type, an infrared type, and a surface acoustic wave type. In addition to the touch panel 531, the input unit 530 may further include the another input device 532. Specifically, the another input device 532 may include, but is not limited to, one or more of a physical keyboard, a functional key (such as a volume control key or a switch key), a track ball, a mouse, and a joystick.

The display unit 540 may be configured to display information inputted by the user or information provided for the user, and various menus of the mobile phone. The display unit 540 may include a display panel 541. In some embodiments, the display panel 541 may be configured by using a liquid crystal display (LCD), an organic light-emitting diode (OLED), or the like. Further, the touch panel 531 may cover the display panel 541. After detecting a touch operation on or near the touch panel, the touch panel 531 transfers the operation to the processor 580 to determine a touch event type. Then the processor 580 provides corresponding visual output on the display panel 541 according to the touch event type. Although in FIG. 10, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. Specifically, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 560, a speaker 561, and a microphone 562 may provide audio interfaces between a user and the mobile phone. The audio circuit 560 may convert received audio data into an electrical signal and transmit the electrical signal to the speaker 561. The speaker 561 converts the electrical signal into a voice signal for output. On the other hand, the microphone 562 converts a collected voice signal into an electrical signal. The audio circuit 560 receives the electrical signal, converts the electrical signal into audio data, and outputs the audio data to the processor 580 for processing. Then, the processor transmits the audio data to, for example, another mobile phone by using the RF circuit 510, or outputs the audio data to the memory 520 for further processing.

Wi-Fi is a short distance wireless transmission technology. The mobile phone may help, by using the Wi-Fi module 570, a user to receive and transmit an email, browse a web page, access stream media, and the like. This provides wireless broadband Internet access for the user. Although FIG. 10 shows the Wi-Fi module 570, it may be understood that the Wi-Fi module is not a necessary component of the mobile phone, and the Wi-Fi module may be omitted as required provided that the scope of the essence of the present disclosure is not changed.

The processor 580 is a control center of the mobile phone, and is connected to various parts of the entire mobile phone by using various interfaces and lines. By running or executing a software program and/or module stored in the memory 520, and invoking data stored in the memory 520, the processor 580 executes various functions of the mobile phone and performs data processing, thereby monitoring the entire mobile phone. In some embodiments, the processor 580 may include one or more processing units. In some embodiments, the processor 580 may integrate an application processor and a modem processor. The application processor mainly processes an operating system, a user interface, an application program, and the like. The modem processor mainly processes wireless communication. It may be understood that the foregoing modem processor may either not be integrated into the processor 580.

The mobile phone further includes the power supply 590 (such as a battery) for supplying power to the components. In some embodiments, the power supply may be logically connected to the processor 580 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of this application, the processor 580 included in the terminal device further has the following functions:

obtaining an image frame sequence corresponding to a to-be-classified video file, the image frame sequence including T image frames, T being an integer greater than 1;

obtaining an appearance information feature sequence corresponding to the image frame sequence, the appearance information feature sequence including T appearance information features, each appearance information feature having a correspondence with one of the T image frames;

obtaining a motion information feature sequence corresponding to the appearance information feature sequence, the motion information feature sequence including T motion information features, each motion information feature having a correspondence with one of the T appearance information feature; and determining a video classification result of the to-be-classified video file according to the appearance information feature sequence and the motion information feature sequence;

In a possible implementation, the processor 580 is configured to:

obtain the appearance information feature sequence corresponding to the image frame sequence by using an image classification network model; and the obtaining a motion information feature sequence corresponding to the appearance information feature sequence includes:

obtaining the motion information feature sequence corresponding to the appearance information feature sequence by using a motion prediction network model, the motion prediction network model being configured to predict the motion information features corresponding to the appearance information features.

In a possible implementation, the processor 580 is configured to:

obtain the to-be-classified video file; and decode the to-be-classified video file, to obtain the image frame sequence, a sampling frequency for each image frame being the same.

In a possible implementation, the processor 580 is configured to:

obtain an appearance information feature corresponding to a $t^{th}$ image frame, t being an integer greater than or equal to 1 and less than or equal to T; and generate the appearance information feature sequence according to the T appearance information features when an appearance information feature corresponding to each of the T image frames has been obtained.

In a possible implementation, the processor 580 is configured to:

obtain a $t^{th}$ appearance information feature corresponding to an $i^{th}$ step, i being an integer greater than or equal to 1, and t being an integer greater than or equal to 1 and less than or equal to T;

obtain a $(t+1)^{th}$ motion information feature and a $(t-1)^{th}$ motion information feature corresponding to an $(i-1)^{th}$ step;

determine a $t^{th}$ motion information feature corresponding to the $i^{th}$ step according to the $t^{th}$ appearance information feature, the $(t+1)^{th}$ motion information feature, and the $(t-1)^{th}$ motion information feature; and generate the motion information feature sequence according to the T motion information features when a motion information feature corresponding to each of the T appearance information features has been obtained.

In a possible implementation, the processor 580 is configured to:

calculate a $(t+1)^{th}$ update gate vector and a $(t-1)^{th}$ update gate vector corresponding to the $i^{th}$ step according to the $t^{th}$ appearance information feature, the $(t+1)^{th}$ motion information feature, and the $(t-1)^{th}$ motion information feature by using an update gate of the motion prediction network model;

calculate a $(t+1)^{th}$ output gate vector and a $(t-1)^{th}$ output gate vector corresponding to the $i^{th}$ step according to the $t^{th}$ appearance information feature, the $(t+1)^{th}$ motion information feature, and the $(t-1)^{th}$ motion information feature by using an output gate of the motion prediction network model;

calculate a $t^{th}$ hidden state feature vector corresponding to the $i^{th}$ step according to the $t^{th}$ appearance information feature, the $(t+1)^{th}$ motion information feature, the $(t-1)^{th}$ motion information feature, the $(t+1)^{th}$ update gate vector, and the $(t-1)^{th}$ update gate vector by using a hidden state of the motion prediction network model; and calculate the $t^{th}$ motion information feature corresponding to the $i^{th}$ step according to the $t^{th}$ hidden state feature vector and the $(t+1)^{th}$ output gate vector and the $(t-1)^{th}$ output gate vector corresponding to the $i^{th}$ step by using a final output layer of the motion prediction network model.

In a possible implementation, the processor 580 is configured to:

calculate the $(t+1)^{th}$ update gate vector and the $(t-1)^{th}$ update gate vector in the following manner:

$$r_{t-1} = \sigma(W_r x_t + U_{r,t-1} s_{t-1}^{i-1});$$

$$r_{t+1} = \sigma(W_r x_t + U_{r,t+1} s_{t+1}^{i-1});$$

where $r_{t-1}$ represents the $(t-1)^{th}$ update gate vector corresponding to the $i^{th}$ step, t represents a $t^{th}$ time point, $r_{t+1}$ represents the $(t+1)^{th}$ update gate vector corresponding to the $i^{th}$ step, $\sigma(\ )$ represents a rectified linear unit, represents a first parameter matrix, $U_{r,t-1}$ represents a second parameter matrix corresponding to the $(t-1)^{th}$ update gate vector, $U_{r,t+1}$ represents a third parameter matrix corresponding to the $(t+1)^{th}$ update gate vector, $x_t$ represents the $t^{th}$ appearance information feature, $s_{t-1}^{i-1}$ represents the $(t-1)^{th}$ motion information feature corresponding to the $(i-1)^{th}$ step, and $s_{t+1}^{i-1}$ represents the $(t+1)^{th}$ motion information feature corresponding to the $(i-1)^{th}$ step;

the processor 580 is configured to:

calculate the $(t+1)^{th}$ output gate vector and the $(t-1)^{th}$ output gate vector in the following manner:

$$[z_{t+1}, z, z_{t-1}] = \text{soft max}([\tilde{z}_{t+1}, 1, \tilde{z}_{t-1}]);$$

$$\tilde{z}_{t-1} = \sigma(W_z x_t + U_{z,t-1} s_{t-1}^{i-1});$$

$$\tilde{z}_{t+1} = \sigma(W_z x_t + U_{z,t+1} s_{t+1}^{i-1});$$

where $z_{t+1}$ represents the $(t+1)^{th}$ output gate vector corresponding to the $i^{th}$ step, $z_{t-1}$ represents the $(t-1)^{th}$ output gate vector corresponding to the $i^{th}$ step, z represents a preset output gate vector, $\tilde{z}_{t-1}$ represents a $(t-1)^{th}$ to-be-processed output gate vector corresponding to the $i^{th}$ step, $\tilde{z}_{t+1}$ represents a $(t+1)^{th}$ to-be-processed output gate vector corresponding to the $i^{th}$ step, soft max ( ) represents a normalization function, $W_z$ represents a fourth parameter matrix, $U_{z,t-1}$ represents a fifth parameter matrix corresponding to the $(t-1)^{th}$ output gate vector, and $U_{z,t+1}$ represents a sixth parameter matrix corresponding to the $(t+1)^{th}$ output gate vector;

the processor 580 is configured to:

calculate the $t^{th}$ hidden state feature vector in the following manner:

$$h_t = \phi(W_h x_t + U_h [s_{t+1}^{i-1} \circ r_{t+1}, s_{t-1}^{i-1} \circ r_{t-1}]^T);$$

where $hd_t$ represents the $t^{th}$ hidden state feature vector corresponding to the $i^{th}$ step, $\phi(\ )$ represents a sigmoid function, $W_h$ represents a seventh parameter matrix, $U_h$ represents an eighth parameter matrix, $[\ ]^T$ represents a matrix transpose, and $\circ$ represents dot multiplication; and the processor 580 is configured to:

calculate the $t^{th}$ motion information feature in the following manner:

$$s_t^i = z \circ h_t + z_{t-1} \circ s_{t-1}^{i-1} + z_{t+1} \circ s_{t+1}^{i-1};$$

where $s_t^i$ represents the $t^{th}$ motion information feature corresponding to the $i^{th}$ step.

In a possible implementation, the processor 580 is configured to:

obtain a video class vector corresponding to the appearance information feature sequence and the motion information feature sequence, the video class vector including C video class elements, C being an integer greater than 1;

determine at least one target video class element from the video class vector; and generate the video classification result of the to-be-classified video file according to the at least one target video class element.

Figure 11:
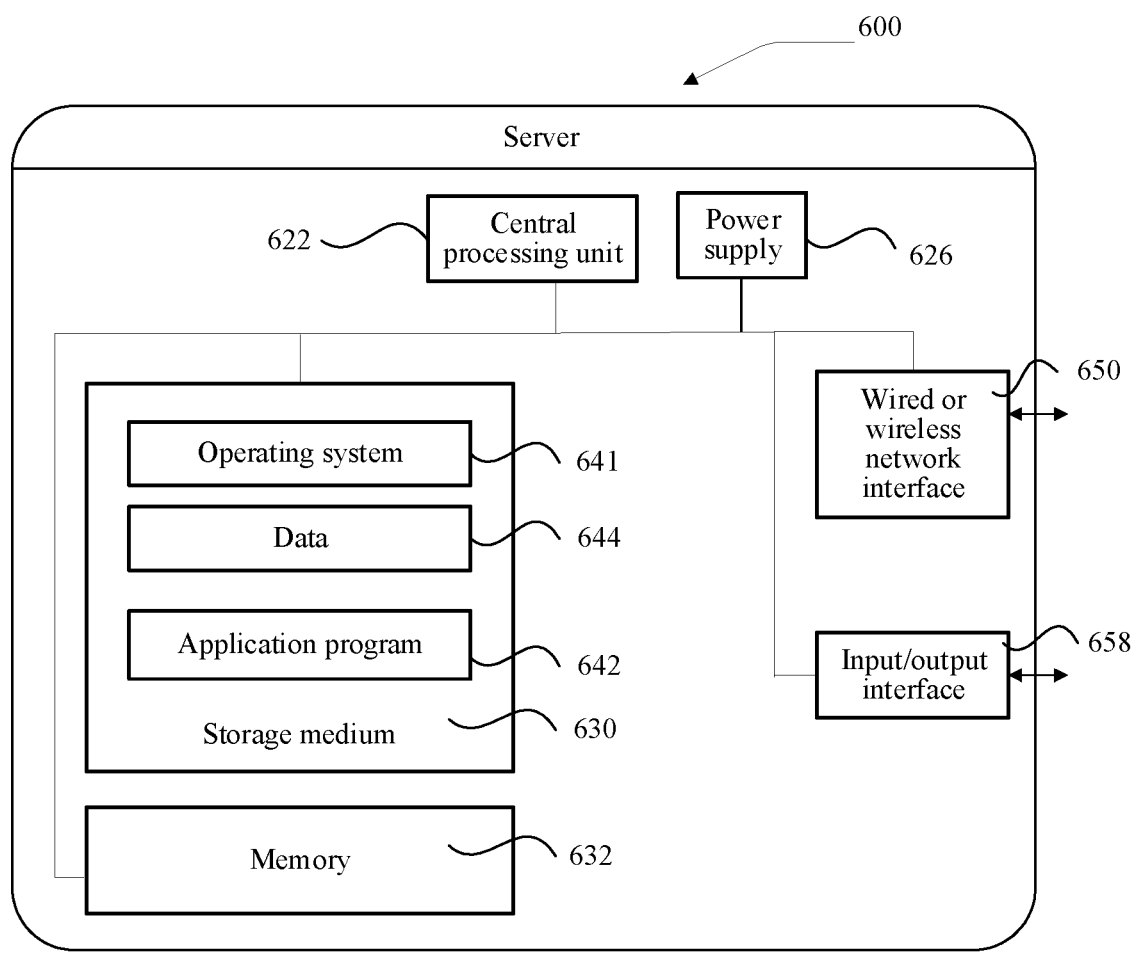
FIG. 11 is a schematic structural diagram of a server according to an embodiment of this application.

FIG. 11 is a schematic structural diagram of a server according to an embodiment of this application. The server 600 may vary greatly due to different configurations or performance, and may include one or more central processing units (CPUs) 622 (for example, one or more processors) and a memory 632, and one or more storage media 630 (for example, one or more mass storage devices) that store application programs 642 or data 644. The memory 632 and the storage medium 630 may be transient or persistent storage. The program stored in the storage medium 630 may include one or more modules (not shown in the figure), and each module may include a series of instruction operations for the server. Still further, the CPU 622 may be configured to communicate with the storage medium 630 to perform the series of instruction operations in the storage medium 630 on the server 600.

The server 600 may further include one or more power supplies 626, one or more wired or wireless network interfaces 650, one or more input/output interfaces 658, and/or one or more operating systems 641 such as Windows Server™, Mac OS X™, Unix™, Linux™, or FreeBSD™.

The steps performed by the server in the foregoing embodiment may be based on the server structure shown in FIG. 11.

In this embodiment of this application, the CPU 622 included in the server further has the following functions:

obtaining an image frame sequence corresponding to a to-be-classified video file, the image frame sequence including T image frames, T being an integer greater than 1;

obtaining an appearance information feature sequence corresponding to the image frame sequence, the appearance information feature sequence including T appearance information features, each appearance information feature having a correspondence with one of the T image frames;

obtaining a motion information feature sequence corresponding to the appearance information feature sequence, the motion information feature sequence including T motion information features, each motion information feature having a correspondence with one of the T appearance information feature; and determining a video classification result of the to-be-classified video file according to the appearance information feature sequence and the motion information feature sequence.

In a possible implementation, the CPU 622 is configured to:

obtain the appearance information feature sequence corresponding to the image frame sequence by using an image classification network model; and the obtaining a motion information feature sequence corresponding to the appearance information feature sequence includes:

obtaining the motion information feature sequence corresponding to the appearance information feature sequence by using a motion prediction network model, the motion prediction network model being configured to predict the motion information features corresponding to the appearance information features.

In a possible implementation, the CPU 622 is configured to:

obtain the to-be-classified video file; and decode the to-be-classified video file, to obtain the image frame sequence, a sampling frequency for each image frame being the same.

In a possible implementation, the CPU 622 is configured to:

obtain an appearance information feature corresponding to a $t^{th}$ image frame, t being an integer greater than or equal to 1 and less than or equal to T; and generate the appearance information feature sequence according to the T appearance information features when an appearance information feature corresponding to each of the T image frames has been obtained.

In a possible implementation, the CPU 622 is configured to:

obtain a $t^{th}$ appearance information feature corresponding to an $i^{th}$ step, i being an integer greater than or equal to 1, and t being an integer greater than or equal to 1 and less than or equal to T;

obtain a $(t+1)^{th}$ motion information feature and a $(t-1)^{th}$ motion information feature corresponding to an $(i-1)^{th}$ step;

determine a $t^{th}$ motion information feature corresponding to the $i^{th}$ step according to the $t^{th}$ appearance information feature, the $(t+1)^{th}$ motion information feature, and the $(t-1)^{th}$ motion information feature; and generate the motion information feature sequence according to the T motion information features when a motion information feature corresponding to each of the T appearance information features has been obtained.

In a possible implementation, the CPU 622 is configured to:

calculate a $(t+1)^{th}$ update gate vector and a $(t-1)^{th}$ update gate vector corresponding to the $i^{th}$ step according to the $t^{th}$ appearance information feature, the $(t+1)^{th}$ motion information feature, and the $(t-1)^{th}$ motion information feature by using an update gate of the motion prediction network model;

calculate a $(t+1)^{th}$ output gate vector and a $(t-1)^{th}$ output gate vector corresponding to the $i^{th}$ step according to the $t^{th}$ appearance information feature, the $(t+1)^{th}$ motion information feature, and the $(t-1)^{th}$ motion information feature by using an output gate of the motion prediction network model;

calculate a $t^{th}$ hidden state feature vector corresponding to the $i^{th}$ step according to the $t^{th}$ appearance information feature, the $(t+1)^{th}$ motion information feature, the $(t-1)^{th}$ motion information feature, the $(t+1)^{th}$ update gate vector, and the $(t-1)^{th}$ update gate vector by using a hidden state of the motion prediction network model; and calculate the $t^{th}$ motion information feature corresponding to the $i^{th}$ step according to the $t^{th}$ hidden state feature vector and the $(t+1)^{th}$ output gate vector and the $(t-1)^{th}$ output gate vector corresponding to the $i^{th}$ step by using a final output layer of the motion prediction network model.

In a possible implementation, the CPU 622 is configured to:

calculate the $(t+1)^{th}$ update gate vector and the $(t-1)^{th}$ update gate vector in the following manner:

$$r_{t-1} = \sigma(W_r x_t + U_{r,t-1} s_{t-1}^{i-1});$$

$$r_{t+1} = \sigma(W_r x_t + U_{r,t-1} s_{t+1}^{i-1});$$

where $r_{t-1}$ represents the $(t-1)^{th}$ update gate vector corresponding to the $i^{th}$ step, t represents a $t^{th}$ time point, represents the $(t+1)^{th}$ update gate vector corresponding to the $i^{th}$ step, $\sigma(\ )$ represents a rectified linear unit, $W_r$ represents a first parameter matrix, $U_{r,t-1}$ represents a second parameter matrix corresponding to the $(t-1)^{th}$ update gate vector, $U_{r,t+1}$ represents a third parameter matrix corresponding to the $(t+1)^{th}$ update gate vector, $x_t$ represents the $t^{th}$ appearance information feature, $s_{t-1}^{i-1}$ represents the $(t-1)^{th}$ motion information feature corresponding to the $(i-1)^{th}$ step, and $s_{t+1}^{i-1}$ represents the $(t+1)^{th}$ motion information feature corresponding to the $(i-1)^{th}$ step;

the CPU 622 is configured to:
calculate the $(t+1)^{th}$ output gate vector and the $(t-1)^{th}$ output gate vector in the following manner:

$$[z_{t+1}, z, z_{t-1}] = \text{soft max}([\tilde{z}_{t+1}, 1, \tilde{z}_{t-1}]);$$

$$\tilde{z}_{t-1} = \sigma(W_z x_t + U_{z,t-1} s_{t-1}^{i-1});$$

$$\tilde{z}_{t+1} = \sigma(W_z x_t + U_{z,t+1} s_{t+1}^{i-1});$$

where $z_{t+1}$ represents the $(t+1)^{th}$ output gate vector corresponding to the $i^{th}$ step, $z_{t-1}$ represents the $(t-1)^{th}$ output gate vector corresponding to the $i^{th}$ step, z represents a preset output gate vector, $\tilde{z}_{t-1}$ represents a $(t-1)^{th}$ to-be-processed output gate vector corresponding to the $i^{th}$ step, $\tilde{z}_{t+1}$ represents a $(t+1)^{th}$ to-be-processed output gate vector corresponding to the $i^{th}$ step, soft max (represents a normalization function, $W_z$ represents a fourth parameter matrix, $U_{z,t-1}$ represents a fifth parameter matrix corresponding to the $(t-1)^{th}$ output gate vector, and $U_{z,t+1}$ represents a sixth parameter matrix corresponding to the $(t+1)^{th}$ output gate vector;

the CPU 622 is configured to:
calculate the $t^{th}$ hidden state feature vector in the following manner:

$$h_t = \phi(W_h x_t + U_h [s_{t+1}^{i-1} \circ r_{t+1}, s_{t-1}^{i-1} \circ r_{t-1}]^T);$$

where $h_t$ represents the $t^{th}$ hidden state feature vector corresponding to the $i^{th}$ step, $\phi(\ )$ represents a sigmoid function, $W_h$ represents a seventh parameter matrix, $U_h$ represents an eighth parameter matrix, $[\ ]^T$ represents a matrix transpose, and $\circ$ represents dot multiplication; and the CPU 622 is configured to:
calculate the $t^{th}$ motion information feature in the following manner:

$$s_t^i = z \circ h_t + z_{t-1} \circ s_{t-1}^{i-1} + z_{t+1} \circ s_{t+1}^{i-1};$$

where $s_t^i$ represents the $t^{th}$ motion information feature corresponding to the $i^{th}$ step.

In a possible implementation, the CPU 622 is configured to:

obtain a video class vector corresponding to the appearance information feature sequence and the motion information feature sequence, the video class vector including C video class elements, C being an integer greater than 1;

determine at least one target video class element from the video class vector; and generate the video classification result of the to-be-classified video file according to the at least one target video class element.

In this embodiment of this application, the CPU 622 included in the server further has the following functions:

obtaining an optical flow image sequence corresponding to a to-be-trained video file, the optical flow image sequence including a plurality of optical flow images;

obtaining a to-be-trained appearance information feature sequence corresponding to the to-be-trained video file, the to-be-trained appearance information feature sequence including a plurality of to-be-trained appearance information features;

obtaining an actual motion information feature sequence according to the optical flow image sequence corresponding to the to-be-trained video file, the actual motion information feature sequence including T actual motion information features, T being an integer greater than 1;

obtaining a predicted motion information feature sequence corresponding to the to-be-trained appearance information feature sequence by using a to-be-trained motion prediction network model, the predicted motion information feature sequence including T predicted motion information features;

determining a model parameter according to the actual motion information feature sequence and the predicted motion information feature sequence; and training the to-be-trained motion prediction network model by using the model parameter, to obtain a motion prediction network model.

In a possible implementation, the processor is configured to:

perform calculation according to the actual motion information feature sequence and the predicted motion information feature sequence by using a loss function, to obtain a target loss result; and determine the model parameter according to the target loss result.

In a possible implementation, the processor is configured to:

calculate the target loss result in the following manner:

$$L_{MSE} = \frac{1}{T} \sum_t^T \|\tilde{s}^t - s^t\|_2^2;$$

where $L_{MSE}$ represents the target loss result, T represents a quantity of actual motion information features in the actual motion information feature sequence, $\tilde{S}^t$ represents a $t^{th}$ actual motion information feature in the actual motion information feature sequence, and $S^t$ represents a $t^{th}$ predicted motion information feature in the predicted motion information feature sequence, t being an integer greater than or equal to 1 and less than or equal to T.

A person skilled in the art can clearly understand that for convenience and conciseness of description, for specific working processes of the foregoing systems, apparatuses and units, reference may be made to the corresponding processes in the foregoing method embodiments, and details are not described herein again.

In the several embodiments provided in this application, it is to be understood that the disclosed system, apparatus, and method may be implemented in other manners. For example, the described apparatus embodiments are merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and components displayed as units may or may not be physical units, that is, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art is to understand that modifications may still be made to the technical solutions described in the foregoing embodiments or equivalent replacements may be made to some technical features thereof, as long as such modifications or replacements do not cause the essence of corresponding technical solutions to depart from the spirit and scope of the technical solutions of the embodiments of this application.

What is claimed is:

1. A video classification method, applicable to a computer device, the method comprising:
   obtaining an image frame sequence corresponding to a to-be-classified video file, the image frame sequence comprising T image frames, T being an integer greater than 1;
   obtaining an appearance information feature sequence corresponding to the image frame sequence by applying the image frame sequence as an input to an image classification network model, the appearance information feature sequence comprising T appearance information features, each appearance information feature having a correspondence with one of the T image frames;
   obtaining a motion information feature sequence corresponding to the appearance information feature sequence by applying the appearance information feature sequence as input to a motion prediction network model and predicting the motion information features using the appearance information features, the motion information feature sequence comprising T motion information features, each motion information feature having a correspondence with one of the T appearance information features; and
   determining a video classification result of the to-be-classified video file according to the appearance information feature sequence and the motion information feature sequence.

2. The method according to claim 1, wherein the obtaining an image frame sequence corresponding to a to-be-classified video file comprises:
   obtaining the to-be-classified video file; and
   decoding the to-be-classified video file, to obtain the image frame sequence, a sampling frequency for each image frame being the same.

3. The method according to claim 1, wherein the obtaining an appearance information feature sequence corresponding to the image frame sequence comprises:
   obtaining an appearance information feature corresponding to a $t^{th}$ image frame, t being an integer greater than or equal to 1 and less than or equal to T; and
   generating the appearance information feature sequence according to the T appearance information features when an appearance information feature corresponding to each of the T image frames has been obtained.

4. The method according to claim 1, wherein the obtaining a motion information feature sequence corresponding to the appearance information feature sequence comprises:
   obtaining a $t^{th}$ appearance information feature corresponding to an $i^{th}$ step, i being an integer greater than or equal to 1, and t being an integer greater than or equal to 1 and less than or equal to T;
   obtaining a $(t+1)^{th}$ motion information feature and a $(t-1)^{th}$ motion information feature corresponding to an $(i-1)^{th}$ step;
   determining a $t^{th}$ motion information feature corresponding to the $i^{th}$ step according to the $t^{th}$ appearance information feature, the $(t+1)^{th}$ motion information feature, and the $(t-1)^{th}$ motion information feature; and
   generating the motion information feature sequence according to the T motion information features when a motion information feature corresponding to each of the T appearance information features has been obtained.

5. The method according to claim 4, wherein the determining a $t^{th}$ motion information feature corresponding to the $i^{th}$ step according to the $t^{th}$ appearance information feature, the $(t+1)^{th}$ motion information feature, and the $(t-1)^{th}$ motion information feature comprises:
calculating a $(t+1)^{th}$ update gate vector and a $(t-1)^{th}$ update gate vector corresponding to the $i^{th}$ step according to the $t^{th}$ appearance information feature, the $(t+1)^{th}$ motion information feature, and the $(t-1)^{th}$ motion information feature by using an update gate of the motion prediction network model;
calculating a $(t+1)^{th}$ output gate vector and a $(t-1)^{th}$ output gate vector corresponding to the $i^{th}$ step according to the $t^{th}$ appearance information feature, the $(t+1)^{th}$ motion information feature, and the $(t-1)^{th}$ motion information feature by using an output gate of the motion prediction network model;
calculating a $t^{th}$ hidden state feature vector corresponding to the $i^{th}$ step according to the $t^{th}$ appearance information feature, the $(t+1)^{th}$ motion information feature, the $(t-1)^{th}$ motion information feature, the $(t+1)^{th}$ update gate vector, and the $(t-1)^{th}$ update gate vector by using a hidden state of the motion prediction network model; and
calculating the $t^{th}$ motion information feature corresponding to the $i^{th}$ step according to the $t^{th}$ hidden state feature vector and the $(t+1)^{th}$ output gate vector and the $(t-1)^{th}$ output gate vector corresponding to the $i^{th}$ step by using a final output layer of the motion prediction network model.

6. The method according to claim 1, wherein the determining a video classification result of the to-be-classified video file according to the appearance information feature sequence and the motion information feature sequence comprises:
obtaining a video class vector corresponding to the appearance information feature sequence and the motion information feature sequence, the video class vector comprising C video class elements, C being an integer greater than 1;
determining at least one target video class element from the video class vector; and
generating the video classification result of the to-be-classified video file according to the at least one target video class element.

7. A computer device, comprising: a memory, a transceiver, a processor, and a bus system, the bus system being configured to connect the memory and the processor, to enable the memory and the processor to perform communication,
the memory being configured to store a plurality of programs; and
the processor being configured to execute the plurality of programs in the memory to perform a plurality of operations including:
obtaining an appearance information feature sequence corresponding to the image frame sequence by applying the image frame sequence as an input to an image classification network model, the appearance information feature sequence comprising T appearance information features, each appearance information feature having a correspondence with one of the T image frames;
obtaining a motion information feature sequence corresponding to the appearance information feature sequence by applying the appearance information feature sequence as input to a motion prediction network model and predicting the motion information features using the appearance information features, the motion information feature sequence comprising T motion information features, each motion information feature having a correspondence with one of the T appearance information features; and
obtaining a motion information feature sequence corresponding to the appearance information feature sequence, the motion information feature sequence comprising T motion information features, each motion information feature having a correspondence with one of the T appearance information feature; and
determining a video classification result of the to-be-classified video file according to the appearance information feature sequence and the motion information feature sequence.

8. The computer device according to claim 7, wherein the processor is configured to:
obtain the to-be-classified video file; and
decode the to-be-classified video file, to obtain the image frame sequence, a sampling frequency for each image frame being the same.

9. The computer device according to claim 7, wherein the processor is configured to:
obtain an appearance information feature corresponding to a $t^{th}$ image frame, t being an integer greater than or equal to 1 and less than or equal to T; and
generate the appearance information feature sequence according to the T appearance information features when an appearance information feature corresponding to each of the T image frames has been obtained.

10. The computer device according to claim 7, wherein the processor is configured to:
obtain a $t^{th}$ appearance information feature corresponding to an $i^{th}$ step, i being an integer greater than or equal to 1, and t being an integer greater than or equal to 1 and less than or equal to T;
obtain a $(t+1)^{th}$ motion information feature and a $(t-1)^{th}$ motion information feature corresponding to an $(i-1)^{th}$ step;
determine a $t^{th}$ motion information feature corresponding to the $i^{th}$ step according to the $t^{th}$ appearance information feature, the $(t+1)^{th}$ motion information feature, and the $(t-1)^{th}$ motion information feature; and
generate the motion information feature sequence according to the T motion information features when a motion information feature corresponding to each of the T appearance information features has been obtained.

11. The computer device according to claim 10, wherein the processor is configured to:
calculate a $(t+1)^{th}$ update gate vector and a $(t-1)^{th}$ update gate vector corresponding to the $i^{th}$ step according to the $t^{th}$ appearance information feature, the $(t+1)^{th}$ motion information feature, and the $(t-1)^{th}$ motion information feature by using an update gate of the motion prediction network model;
calculate a $(t+1)^{th}$ output gate vector and a $(t-1)^{th}$ output gate vector corresponding to the $i^{th}$ step according to the $t^{th}$ appearance information feature, the $(t+1)^{th}$ motion information feature, and the $(t-1)^{th}$ motion information feature by using an output gate of the motion prediction network model;

calculate a $t^{th}$ hidden state feature vector corresponding to the $i^{th}$ step according to the appearance information feature, the $(t+1)^{th}$ motion information feature, the $(t-1)^{th}$ motion $t^{th}$ information feature, the $(t+1)^{th}$ update gate vector, and the $(t-1)^{th}$ update gate vector by using a hidden state of the motion prediction network model; and calculate the $t^{th}$ motion information feature corresponding to the $i^{th}$ step according to the $t^{th}$ hidden state feature vector and the $(t+1)^{th}$ output gate vector and the $(t-1)^{th}$ output gate vector corresponding to the $i^{th}$ step by using a final output layer of the motion prediction network model.

12. The computer device according to claim 7, wherein the processor is configured to:

obtain a video class vector corresponding to the appearance information feature sequence and the motion information feature sequence, the video class vector comprising C video class elements, C being an integer greater than 1;

determine at least one target video class element from the video class vector; and generate the video classification result of the to-be-classified video file according to the at least one target video class element.

13. A non-transitory computer-readable storage medium, comprising instructions, the instructions, when run on a computer device, causing the computer device to perform a plurality of operations including:

obtaining an image frame sequence corresponding to a to-be-classified video file, the image frame sequence comprising T image frames, T being an integer greater than 1;

obtaining an appearance information feature sequence corresponding to the image frame sequence by applying the image frame sequence as an input to an image classification network model, the appearance information feature sequence comprising T appearance information features, each appearance information feature having a correspondence with one of the T image frames;

obtaining a motion information feature sequence corresponding to the appearance information feature sequence by applying the appearance information feature sequence as input to a motion prediction network model and predicting the motion information features using the appearance information features, the motion information feature sequence comprising T motion information features, each motion information feature having a correspondence with one of the T appearance information features; and determining a video classification result of the to-be-classified video file according to the appearance information feature sequence and the motion information feature sequence.

14. The non-transitory computer-readable storage medium according to claim 13, wherein the obtaining an image frame sequence corresponding to a to-be-classified video file comprises:

obtaining the to-be-classified video file; and decoding the to-be-classified video file, to obtain the image frame sequence, a sampling frequency for each image frame being the same.

15. The non-transitory computer-readable storage medium according to claim 13, wherein the obtaining an appearance information feature sequence corresponding to the image frame sequence comprises:

obtaining an appearance information feature corresponding to a $t^{th}$ image frame, t being an integer greater than or equal to 1 and less than or equal to T; and generating the appearance information feature sequence according to the T appearance information features when an appearance information feature corresponding to each of the T image frames has been obtained.

16. The non-transitory computer-readable storage medium according to claim 13, wherein the obtaining a motion information feature sequence corresponding to the appearance information feature sequence comprises:

obtaining a $t^{th}$ appearance information feature corresponding to an $i^{th}$ step, i being an integer greater than or equal to 1, and t being an integer greater than or equal to 1 and less than or equal to T;

obtaining a $(t+1)^{th}$ motion information feature and a $(t-1)^{th}$ motion information feature corresponding to an $(i-1)^{th}$ step;

determining a $t^{th}$ motion information feature corresponding to the $i^{th}$ step according to the $t^{th}$ appearance information feature, the $(t+1)^{th}$ motion information feature, and the $(t-1)^{th}$ motion information feature; and generating the motion information feature sequence according to the T motion information features when a motion information feature corresponding to each of the T appearance information features has been obtained.

17. The non-transitory computer-readable storage medium according to claim 13, wherein the determining a video classification result of the to-be-classified video file according to the appearance information feature sequence and the motion information feature sequence comprises:

obtaining a video class vector corresponding to the appearance information feature sequence and the motion information feature sequence, the video class vector comprising C video class elements, C being an integer greater than 1;

determining at least one target video class element from the video class vector; and generating the video classification result of the to-be-classified video file according to the at least one target video class element.

* * * * *